United States Patent [19]

Sato et al.

[11] Patent Number: 5,586,324
[45] Date of Patent: *Dec. 17, 1996

[54] COMPUTER SYSTEM HAVING SYSTEM FEATURE EXTENSION SOFTWARE CONTAINING A SELF-DESCRIBING FEATURE TABLE FOR ACCESSING I/O DEVICES ACCORDING TO MACHINE INDEPENDENT FORMAT

[75] Inventors: N. Albert Sato; David C. Baker, both of Austin; Christie J. Waldron, Plano, all of Tex.

[73] Assignee: Dell U.S.A., L.P., Austin, Tex.

[*] Notice: The term of this patent shall not extend beyond the expiration date of Pat. No. 5,291,585.

[21] Appl. No.: 163,246

[22] Filed: Dec. 6, 1993

Related U.S. Application Data

[63] Continuation of Ser. No. 737,086, Jul. 29, 1991, Pat. No. 5,291,585.

[51] Int. Cl.⁶ ............................................. G06F 13/00
[52] U.S. Cl. ....................... 395/652; 395/830; 395/883; 395/681
[58] Field of Search ............................. 395/500, 700, 395/828, 883, 892, 830, 831; 364/280, 280.2, 280.9, 975.2, 976

[56] References Cited

U.S. PATENT DOCUMENTS

| | | | |
|---|---|---|---|
| 4,589,063 | 5/1986 | Shah et al. | 395/275 |
| 4,649,479 | 3/1987 | Advani et al. | 395/700 |
| 4,858,114 | 8/1989 | Heath et al. | 395/775 |
| 4,928,237 | 5/1990 | Bealkowski et al. | 395/500 |
| 5,014,193 | 5/1991 | Garner et al. | 395/275 |
| 5,022,077 | 6/1991 | Bealkowski | 380/4 |
| 5,063,496 | 11/1991 | Dayan et al. | 395/700 |
| 5,136,709 | 8/1992 | Shirakabe et al. | 395/700 |
| 5,307,491 | 4/1994 | Feriozi et al. | 395/700 |
| 5,459,867 | 10/1995 | Adams et al. | 395/700 |
| 5,465,364 | 11/1995 | Lathrop et al. | 395/700 |

OTHER PUBLICATIONS

Glass, L. Brett, entitled "Protected Mode", *BYTE* (Dec. 1989), pp. 377–384.
Sartore, Ron, entitled "The 80486: A Hardware Perspective", *BYTE IBM Special Edition* (Fall 1989), pp. 67–74.
Glass, L. Brett, entitled "Insider EISA", *BYTE* (Nov. 1989), pp. 417–425.
Pajari, George E., entitled "Interrupts Aren't Always Best", *BYTE* (May 1989), pp. 261–264.
Glass, Brett, entitled "The IBM PC BIOS", *BYTE* (Apr. 1989), pp. 303–310.
Glass, Brett, entitled "Hard Disk Interfaces", *BYTE* (Feb. 1989), pp. 293–307.
Field, Tim, entitled "Installable Device Drivers for PC–DOS 2.0", *BYTE* (Nov. 1983), pp. 188–196.

*Primary Examiner*—Thomas G. Black
*Assistant Examiner*—Jack M. Choules
*Attorney, Agent, or Firm*—Haynes and Boone, L.L.P.

[57] ABSTRACT

A computer system with self-describing feature table accessible by device drivers. Thus a simple process can access these feature tables to fully customize the device drivers at installation, or at boot: or the device driver can branch on the data in the feature table. Thus, a new degree of flexibility is achieved without degrading performance.

1 Claim, 6 Drawing Sheets

HEADER

| signature | version number |
|---|---|

Machine-Specific Feature Descriptors

| feature id 0 | attr 0 | ptr Function 0 |
|---|---|---|
| feature id 1 | attr 1 | ptr Function 1 |
| chain id | | ptr to next fragment |

| feature id 2 | attr 2 | ptr Function 2 |
|---|---|---|
| feature id 3 | attr 3 | ptr Function 3 |
| . | . | . |
| . | . | . |
| . | . | . |
| feature id n | attr n | ptr Function n |
| null id | | |

FIG. 1

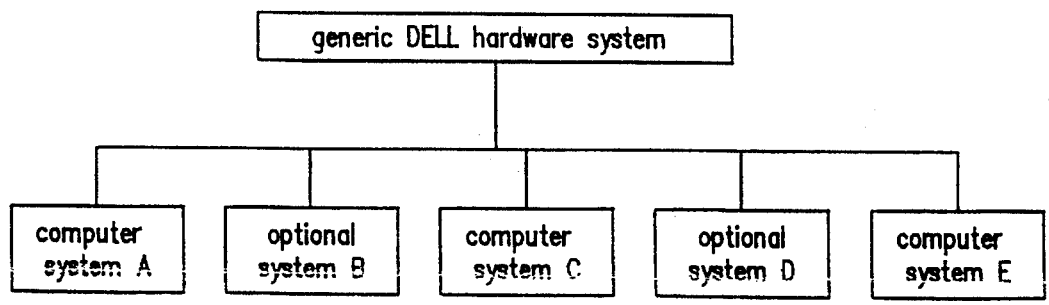

Hardware system class hierarchy.
The generic class object will contain a table of hardware features which each system subclass can inherit or modify.

FIG. 2

| MEMBER | LENGTH | DESCRIPTION |
|---|---|---|
| feature id | 2 bytes | Selector used to identify system features |
| attributes | 2 bytes | Feature characteristic indicators where:<br>Bit 0 = XBIOS ptr is a real mode entry<br>Bit 1 = XBIOS ptr is a protect mode entry<br>    Bimodal = real & protect bits set<br>    Data = real & protect bits zero<br>Bit 2 = Reserved<br>Bit 3 = XBIOS ptr format<br>    0 = linear<br>    1 = seg:offset<br>Bit 4 = optional keystroke trigger<br>Bit 5 = optional appendix<br>Bits 6-15 = Reserved |
| XBIOS ptr | 4 bytes | References a feature routine or data |
| keystroke | 2 bytes | Optional feature keystroke trigger where:<br>High byte = keystroke trigger shift state<br>    Bit 0 = Ctrl shift state<br>    Bit 1 = Alt shift state<br>    Bits 2-7 = Reserved<br>Low byte = scan code |
| appendix | variable | Optional data append to entry where:<br>Length = 2-byte field containing the size of the subsequent variable block<br>Block = variable length appended data |

FIG. 3

\* F000:ED00 (XBIOS Fixed address – start of OEM reserved area)

```
;* XBIOS FEATURE ROUTINE TEMPLATE                              *;

xbinput     struc                                   ;input map
    xi0         dw      ?
    xi1         dd      ?
    xi2         db      ?
xbinput     ends xboutput    struc                                   ;output map
    xo0         dw      ?
xboutput    ends xbstkframe  struc                                   ;stack frame map
    xin         db      (type xbinput)    dup (?)   ;input area
    xout        db      (type xboutput)   dup (?)   ;output area
    xsub        dw      ?                           ;subfunction id
xbstkframe  ends XbiosProc   proc    far
            push    ds                              ;save ds register . . .
            push    cs                              ;set ds register . . .
            pop     ds                              ; addressability
            .
            mov     cx, es:[bx] .xin.xi0            ;get 1st input parm
            mov     es:[bx].xout.xo0, cx            ;move cx to output
            .
            mov     si, es:[bx] .xsub               ;get subfunction id . . .
            shl     si, 1                           ; determine address . . .
            call    subfunctbl [si]                 ;Call the subfunction.
            .
            mov     ax, XBS_STAT                    ;move status to AX.
            pop     ds                              ;restore ds register
            ret                                     ;return to caller
XbiosProc   endp
```

FIG. 6

COMPUTER SYSTEM HAVING SYSTEM FEATURE EXTENSION SOFTWARE CONTAINING A SELF-DESCRIBING FEATURE TABLE FOR ACCESSING I/O DEVICES ACCORDING TO MACHINE INDEPENDENT FORMAT

This is a Continuation of application Ser. No. 07/737,086 filed Jul. 29, 1991 now U.S. Pat. No. 5,291,585.

BACKGROUND AND SUMMARY OF THE INVENTION

The present invention relates to computer systems, and particularly to single-user or few-user small systems.
How Application Programs Interact with Hardware One of the most basic needs in computer architecture is making it easier for a variety of software programs to interact correctly and efficiently with a variety of hardware configurations. Much of the development in computer architecture can be seen as a steady progression of techniques for addressing this need.

Note the emphasis on efficiency, in the foregoing statement. Even where existing standards can assure compatibility, the search for greater speed or expanded functionality will frequently draw programmers to circumvent the software standards. A good example of this countercurrent appeared in the early days of graphics development on the IBM PC: the BIOS provided a standard interface to video driver operations, but software developers discovered that they could vastly improve performance by making calls directly to the video driver hardware. Thus adherence to the standard architecture was not enough to assure computer designers that their customers would be able to run popular IBM-compatible software, such as Flight Simulator, on their supposedly IBM-compatible machines. Thus, there is a continuing tension between compatibility and efficiency.

When any particular piece of hardware is examined in isolation it can usually be best described in terms of electrical relationships. For example, a memory specification may state that, within a certain range of delay after certain voltages appear on certain lines, certain other lines will be driven to a corresponding state (which is dependent on the data previously stored in the memory). The specification for an input device, such as a keyboard, may state that, when certain voltages appear on certain lines, a particular input operation may be considered to have occurred. The specification for an output device, such as a video card, may state that, when certain voltages appear on certain lines within a certain timing relationship and protocol, each pixel within a certain defined display device will be driven to an optical state which corresponds to a certain portion of the protocol. However, a commercial application program will be written in a programming language (e.g. in assembly language or in C) which is somewhat machine-independent. There is a great difference between these two levels of description: but this gap must be bridged in order to economically develop application software which can run on a wide range of machines.

Several layers of software and firmware structure are used to mediate between application programs and the underlying hardware. To better show the context of the invention, these layers will be described below in greater detail.
Hardware Variability Computer hardware configurations are inherently diverse. The complexity of any modern computer system is high enough that even a very detailed standard architecture (such as the "AT" architecture which was introduced with IBM's 80286-based machines) will not prevent variations from occurring. Whenever designers independently work within a standard they are likely to find ways to make improvements. As such variations occur, some of them will be seen to be significant. Thus the future will often find that any standard contained significant "gray" areas.

This is true not only in motherboard design, but also in I/O devices. For example, two display drivers which both conform to the VGA standard may nevertheless differ in timing, to an extent which may be significant to some software applications. Moreover, there will always be users with needs for specialized input or output devices.

Even within the very restricted world of "PC" architectures (where all machines must conform to numerous constraints of the "standard" architectures), hardware variability continues to be a problem. The range of hardware variability in (for example) computers which can run UNIX is far larger.

This hardware variability is not merely accidental, but will continue: users are eager to take advantage of new developments, and the pace of innovation is generally far too rapid to permit stabilization of standardized hardware configurations.
Layers of Software and Firmware Structure In order to mediate between application programs and the underlying hardware, several layers of software and firmware structure are used. To better show the context of the invention, these layers will be described below in greater detail.
Startup Software (POST, Bootstrap, etc.)

When power is first applied to a computer, the various hardware elements (chips and subsystems) will each have their own internal procedures (reset procedures) to regain a stable and known state. However, at some point (if the hardware is intact), these reset procedures will have ended, and at this point the CPU performs various important overhead tasks. These include, for example, surveying the system configuration, performing sanity checks on system hardware, issuing diagnostic signals (such as sounding beeps through a speaker or turning on LEDs), and permitting the user to branch into an NVRAM configuration program under software control. This phase of operation is generally referred to as "POST" (Power-On-Self-Test). After POST, a "bootstrap" program is run, to permit the CPU to begin execution of other software. For robustness, the POST and bootstrap software is normally stored in a read-only memory. The bootstrap program launches the CPU on execution of the primary operating system software; depending on how the system has been set up, the boot software may direct program execution into DOS, Unix, PS/2, a DOS variant, or another operating system. This is normally automatic and predetermined, but is manually user-selectable in some systems. However, the choice of operating system is not particularly relevant to the inventions described in the present application the primary operating system can then be used by the user to launch an application program, either manually or automatically.
Basic Input/Output System Software (BIOS)

In many types of modern personal computers (and in all "IBM-compatible" personal computers), a key part of the system software is a "basic input/output system" (BIOS) program. See generally, e.g., the P. Norton, THE PETER NORTON PROGRAMMER'S GUIDE TO THE IBM PC (1985), which is hereby incorporated by reference. The BIOS program contains frequently-used routines for interfacing to key peripherals, The term "peripheral" or "peripheral component" normally refers to those components of a computer system which are not on the motherboard, i.e. which must be addressed through a system bus or over a defined port However, the usage of this term is somewhat variable; sometimes it is used to refer to any I/O device, or only to refer to components which are optional add-ons for interrupt handling, and so forth. Thus, the BIOS software provides some degree of machine-independence. However, in PC-class computers, this independence is not fully exploited by the available commercial software. Many programs bypass the BIOS software, and directly access the underlying hardware addresses or devices. See generally Glass, "The IBM PC BIOS," BYTE. April 1989, pp. 303ff.

For system robustness the BIOS software is normally packaged in a read-only-memory. However, in 1991 IBM introduced a PS/2 system in which the BIOS is at least partially stored on disk. In fact, it is normally packaged together with the startup software mentioned above. Packaging the BIOS, POST and boot routines in ROM makes a very robust firmware system. Short of hardware damage, it is very difficult for a user to distort the system to the point where it will not start up and run (if the operating system software is present). However, this system also provides a considerable degree of flexibility. As the operating system up (after the POST and boot routines), the user can remap address pointers to revector BIOS calls away from the standard BIOS routines, if desired. (It is also common for users to map out the entire BIOS contents into fast RAM, for greater speed). Thus, nowadays the term "BIOS" is often used somewhat more broadly, to refer to this whole collection of basic system routines. However, in the present application references to "BIOS" will normally refer to the BIOS in its narrower sense, i.e. to the collection of I/O handling routines (and associated routines) which can be called on by the operating system or by the application software.

Customized BIOS and BIOS Extensions

The BIOS in IBM-compatible computers is accessed by interrupts, but the vectors for those interrupts can be diverted to other addresses (by overwriting an address pointer in system RAM). This capability, significantly expands the flexibility of the BIOS, and programmers use it very, frequently.

However, while the capability to divert BIOS vectors is useful, it is not sufficient to address many needs. Changes to the interrupt-handling vectors will not affect other portions of the BIOS. Computer designers have found it highly desirable to prepare (or obtain) customized BIOS routines to fully exploit the advantage of their systems. For example, such customized BIOS routines are commonly necessary in very-low-power portable systems, to implement power saving features which maximize battery lifetime. BIOS customization has increasingly been recognized as an important element in rapidly developing a reliable advanced system. See generally Scheier, "Phoenix counters competitors with diversified BIOS offerings," PC Week, vol. 4 no. 38 (Sept. 22, 1987) at 135f; Guterman, "CompuAdd adopts new ROM BIOS for clones," PC Week vol. 5 no. 28 (Jul. 11, 1988) at 6; both of which are hereby incorporated by reference.

One function often provided by BIOS customization is "hot-key" access to a setup menu, or to low-level system hardware features (e.g. monitor brightness adjustment). Such capability is very, useful to system designers, but normally it has had to be realized in a machine-dependent way (so that large chunks of BIOS have had to be rewritten every time a change was made).

Another problem with prior hot-key add-ons is that, if the BIOS interrupt vector for key-handling was diverted, the hot-key capability could be lost. Since many applications do divert the keyboard interrupt (INT9), no critical functionality could be made dependent on such a hot-key operation.

Operating: System Software

The application software will normally interface to an operating system (such as DOS, DOS+Windows, PS/2, UNIX of various flavors, or UNIX plus X-windows). The operating system is a background software program. Some operating systems run continuously, or at least start up at regular intervals, even while an application program is running; other operating systems merely provide capabilities which can be called on by the application software which provides an application programming interface (API) for use by the application software. Thus, the programmers writing application software can write their software to fit the API, rather than having to find out and fit the peculiarities of each particular machine. (A common way of stating this is that the API allows programmers to write for the "virtual machine" defined by the API.) See e.g., Quedens, "Windows virtual machine," *PC Tech Journal* vol. 5, no. 10 p. 90, 92-3, 95, 97, 99-100, 102 (October 1987), which is hereby incorporated by reference.

Graphical User Interface (GUI) Operating System Add-Ons

Some operating systems have been enhanced by the addition of overlaid supplemental operating systems. For example, Windows is a supplement to DOS, and X is a supplement for UNIX. The use of such hybrids does not greatly affect tile foregoing considerations, except that it makes the compatibility issues even more difficult: the designer of a DOS machine must expect that customers will be running some DOS programs, and some Windows programs, on the same machine.

Device Driver Software

A device driver is a lower level of operating system software. Typically a device driver interfaces to the actual peripheral hardware components, and provides routines which application software can use to access the hardware components. Thus, the application software can simply make a call to an installed software subroutine, instead of having to find the specifications of each peripheral device and branch accordingly, whenever a peripheral I/O operation is needed. This permits application software to ignore the detailed specifications of peripheral hardware.

Normally device driver software must contain a description of each target hardware platform. Thus, the software must be revised repeatedly, for reasons which are beyond the control of the companies making peripherals.

In personal computers, installable device drivers were first introduced in DOS 2.0. The role of device drivers has since been expanded, in subsequently introduced operating systems.

In particular, OS/2 provided expanded support for device drivers, including a library of "DevHlp" routines which can be called by device drivers. See generally Duncan, "An examination of the Dev Hlp API (writing OS-2 bimodal device drivers)," 3 *Microsoft Systems Journal* no. 2 (March 1988) at 39ff; Schmitt. "Designing drivers for OS/2: I," *PC Tech Journal* vol. 5, no. 12, p. 164 (1987); and Schmitt, "Designing drivers for OS/2: II," *PC Tech Journal* vol. 6, no. 2 p. 136–155 (February 1988), all of which are hereby incorporated by reference.

System Configuration Tables

Some computer systems have previously used a feature table, stored in nonvolatile memory, to describe various characteristics of the machine. The IBM AT BIOS uses such a feature table (stored in battery-backed CMOS memory). This feature table, in expanded form, has also been used in the IBM PS/2 systems and has been utilized in the system BIOS of all IBM AT- and PS/1-compatible personal computers. This table is in the form of a bit map where each bit refers to specific hardware implementations employed by the designers of the machine. A pointer to this table may be obtained through executing a software interrupt. More specifically, executing interrupt 15h with AH=C0h will return a pointer to the table in ES:BX. However, this feature table is restricted to merely listing certain hardware features in the machine, such as the number of DMA controllers, and does not provide an interface to these features. Furthermore, the elements of the list are fixed.

In the Phoenix Technologies BIOS, there are specified entry points at hard-coded addresses which will perform certain machine-specific functions. These are few in number, must be at fixed addresses, do not support protected mode applications and it is not possible to easily see which features are supported by which machines except by restricting to the common subset.

Under the EISA standard, an EISA Configuration memory is used to store a limited feature table of EISA peripherals on the EISA bus. See generally Glass, "Inside EISA," BYTE magazine, November 1989, at 417ff, which is hereby incorporated by reference.

Application Software

From a system designer's point of view, the application software is (subject only to the minimal constraints of the architectural standards) wholly unpredictable. Many clever people are constantly looking for new ways to exploit the standard architecture, and many innovations continually result. Thus, hardware architects must expect that the application software will not only be unpredictable, but will be as unpredictable as possible. Common applications include spreadsheets, word processors and publishing programs, databases, games, project managers and a wide variety of others: but inevitably users will also run customized applications, and new types of applications.

Utility Programs and Hardware

In recent years, many personal computer manufacturers have expanded their product lines. This has dramatically increased the difficulty of supporting an entire product line in terms of the standard software products that a manufacturer may choose to include or sell with its computers.

Examples are diagnostic programs, operating system software and utility software. It is increasingly necessary to provide a means for such software to identify the individual machines and their unique features, without having to be rewritten each time a new product is introduced.

Furthermore, it may be difficult or undesirable to implement even similar features in exactly the same way, since each design has different constraints in terms of cost and each will incorporate the knowledge gained by building the previous product. The problem gets worse as a product line ages. It is desirable to continue to support older products with newer versions of software, and it is also desirable for older versions of software to run unmodified on newer platforms. One solution to this problem is to write the software to the common subset of functions supported by all platforms. However, this does not allow the manufacturer to differentiate his product from the competition. Consequently, it is desirable for each individual machine to have the capability to identify its own unique feature set to such software, while at the same time providing the individualized means for carrying out those functions.

Innovative Computer System with Self-Describing Extensions to BIOS

The present invention provides a personal computer architecture with an additional layer of overhead software (or firmware) structure. This additional layer of software structure is used to provide access to additional low-level hardware-specific features in a manner which is independent of the operating system. In the present application, these additional low-level hardware-specific features are referred to as "extended features."

Extended Features

An "extended feature", in the presently preferred embodiment, is normally a system level routine used to service hardware components or to obtain system information unique to Dell hardware systems. The detailed disclosure below lists some of the numerous extended features which have been implemented to date. However, of course, other functions can be provided as well.

The disclosed self-describing system software extension provides a lower level of software-hardware interface "cushioning," which device drivers can call on. Thus, the self-describing system software extension can also be exploited to permit device drivers to be more hardware-independent.

The self-describing system software extension is particularly advantageous in its application to an evolving product line within the same overall standard.

Self-Describing Feature Table

The disclosed innovations provide methods by which a computer with some quantity of non-volatile storage can present a self-describing interface which also provides a means for carrying out machine-specific functions in a non-specific way.

In the presently preferred embodiment, the feature table and the machine-specific routines are programmed into EPROM devices, at the start of the "OEM reserved" block of addresses in the BIOS memory, space. In IBM-compatible computers, the BIOS commonly occupies the 64 K or 128 K of address space just below the top of the lowest megabyte of the total memory address space.

An important element of the method is a table which contains a signature to identify it with the system software architecture described herein, and a series of entries with the following information:

Feature ID—a unique identifier for each specific machine-specific function.

Attributes—describe the operating environment for proper access to the function. May limit access to real or protected mode or possibly even to specific operating environments.

Service Routine—a pointer to the program code that performs the requested function.

Data Block—Features may also include an optional data block.

The self-describing system software extension of the presently preferred embodiment includes a self-describing feature table, which can track the peculiarities of the actual hardware configuration of each system as configured. The self-describing system software extension, with this feature table, provides low-level translation for hardware peculiarities.

By use of this feature table, the disclosed innovations provide a computer system which can be updated with self-defining extensions to the basic BIOS (which remains in read-only memory). The basic BIOS must be modified to make use of these self-defining extensions; but, once such a modified BIOS has been installed, it does not have to be updated frequently. Instead, the routines in the modified BIOS can make use of the self-defining feature table without further changes to other portions of BIOS. Thus, for example, in one class of alternative embodiments, the feature table is located in NVSRAM, and a ROM holds the basic BIOS and a pointer to the feature table.

Application Programming Interface to Self-Describing Feature Table

One contemplated and advantageous class of embodiments uses a standard API to the feature table to provide increased portability of access to XBIOS features across applications. (Thus, for example, an OS/2 device driver can be written to wrap this API around XFT calls in such a way that any OS/2 software can make XFT calls through this API.) This provides optimal access to the machine-specific routines across the whole family of computers.) In the sample embodiment described in detail below, this function is not yet included. However, as will be apparent to those skilled in the art, this can readily be implemented in various ways, within the architecture described below, if desired.

Device Drivers in the Innovative System

The disclosed architecture provides access to machine-specific features, with enough information to permit device drivers to be written in a machine-independent way (within the Dell family of computers). Some specific examples of such drivers are given herein, but of course other drivers can also make use of the extended BIOS features as well.

Keyboard Driver

One very advantageous piece which is included in the presently preferred embodiment is the keyboard driver, which permits the user to access XBIOS functions, without exiting his application, by hitting "hot key" combinations. This is highly advantageous in portable systems, since the user can fine-tune his system's hardware parameters to match changing conditions. Thus, the disclosed system allows the user to send BIOS-level function calls right through an application, without saving the context of the application.

This keyboard driver runs under DOS, so it is still possible for a user to disrupt this driver by remapping the keyboard interrupt INT9): but at least this driver does permit language customization to be combined with hot-key access to extended-BIOS functions.

OS/2 Initialization Driver

Another advantageous part of the presently preferred embodiment is an OS/2 initialization driver, which permits easy initialization of hardware-specific functions for OS/2 initialization. This driver, in its presently preferred embodiment, is listed in the appendix.

Common Device Drivers across a Family of Computers

The disclosed innovations have been implemented on a number of different computer systems within the Dell system product line. As of the effective filing date of the present application, these include both EISA and ISA systems; systems based on 80486, 80386, and 386SX microprocessors; systems running at 33 MHz, 25 MHz, and 20 MHz clock rates; systems with one or two hard disks, or up to 10 disks in a drive array; systems with monochrome, VGA, or high-resolution graphics adapters; and a wide variety of other configuration options. Moreover, the disclosed innovations are currently being made available in all new Dell computer designs. Thus, it is expected that, in the near future, every computer in the Dell product family will include the XBIOS described below (or an update thereof).

As discussed below, the disclosed innovations are believed to be advantageous not only as applied to a single computer, but also as applied to a whole family of computers. In the case of the preferred embodiment, suppliers of computer peripherals can be increasingly confident that a device driver which takes advantage of the self-describing system software extension of the presently preferred embodiment will apply to every current Dell computer, and also to future models which the supplier has not yet seen or heard of.

Backward Software Compatibility

A substantial advantage of the disclosed architecture is that additional BIOS-level functions can be readily added into computer system designs, as soon as the innovations occur, without any necessity for radical BIOS changes. The self-describing system software extension of the presently preferred embodiment itself does not degrade BIOS compatibility with prior ISA or EISA machines; and once the self-describing system software extension of the presently preferred embodiment is installed, further extensions to BIOS functionality can readily be achieved.

Additional Background

Two previous proposals for achieving machine-independence will now be discussed, with reference to the present inventions, in order to provide a clearer discussion of how the teachings of the present application differ from these prior teachings.

The "Advanced BIOS" (ABIOS) in PS/2 Architectures

The PS/2 architecture, which IBM introduced in 1987, included a so-called "advanced BIOS" or "ABIOS" There are actually two versions of ABIOS available, since IBM has offered a simplified ABIOS for use on machines other than IBM PS/2s. However, the full functionality of ABIOS is available only on an IBM PS/2. The features of this version of ABIOS are most germane to the background of the present invention (in additional to a more conventional BIOS, known as the "compatibility BIOS" or "CBIOS"). The user can elect to use the CBIOS instead of the ABIOS if he wishes, for downward compatibility; the CBIOS and ABIOS are not designed to run simultaneously.

The ABIOS is a more high-level software structure than ordinary BIOS, and has many features added to enhance performance in OS/2 (which, unlike DOS, is a multi-threaded operating system). However, ABIOS is so complex and ambitious that very few operating system designs have used it.

The ABIOS must normally be initialized: the initialization process surveys the system configuration, and builds a data structure (the CDA) in System RAM. Process threads (or system software called by process threads) can call on this data structure to get information about the hardware they are running on.

The ABIOS is somewhat analogous to a large-scale machine-specific device driver: a process thread can make calls to the ABIOS by submitting a "request block" into the ABIOS's request-handling queue.

When running on an IBM PS/2 under OS/2, the OS/2+ ABIOS combination does make additional DevHlp functions available to device drivers, including provision of a standardized interface which provides some hardware-independence to the device driver software. Thus, the device driver software programs in such a system can include substantially increased functionality. See generally Mizell, "Understanding device drivers in Operating System/2," *IBM Systems Journal* vol. 27, no. 2 p. 170–84 (1988), which is hereby incorporated by reference.

Within the IBM PS/2 family, the interface to ABIOS is identical, regardless of which IBM PS/2 machine it is running on. Within the IBM PS/2 family, the ABIOS provides a significant degree of machine-independence. Thus the ABIOS has some, but not all, of the same goals as the presently preferred embodiment disclosed herein.

Note that the self-describing system software ex-tension of the presently preferred embodiment provides a lower-level component of system software than the ABIOS referenced above. The ABIOS is itself a full standalone BIOS, and may be thought of as a fancy device driver. By contrast, the conventional BIOS is interrupt-driven. By contrast, the self-describing system software extension will not work as a standalone BIOS, and does not even work as a device driver: instead, the self-describing system software extension merely provides services to device drivers and to standalone application programs.

The self-describing system software extension provides functions which are not addressed by the ABIOS, and conversely the ABIOS addresses a great deal of functionality which is not addressed by self-describing system software extension. Thus, these two software systems are complementary. In fact, it would readily be possible to prepare a modification of self-describing system software extension for use as an ABIOS extension. The ABIOS also includes "hooks" for extending ABIOS; insofar as known to the present inventors, nobody has ever taken the trouble to implement this in a practical system, but there is no apparent reason why this could not be done if desired.

The disclosed self-describing system software extension also provides particular advantages in system diagnostics, which are not provided by ABIOS.

The "XBIOS" of the Atari ST

In internal documentation, the self-describing system software extension of the presently preferred embodiment has frequently been referred to as the "XBIOS," and reflections of that terminology can be seen in the source code appended to the present application. However, to prevent confusion, it must be noted that the term "XBIOS" has also been used for a component of the operating system software in the Atari ST computer. While this software is believed not to have included any of the innovative concepts claimed herein, the similarity, in terminology should be noted. See generally, e.g. Rothman, "Atari ST software development, BYTE magazine, vol. 11 no. 9 (September 1986) at 223ff, which is hereby incorporated by reference. The Atari ST is a 68000-based machine. The ST's operating system (called "TOS") has two main parts: The "GEM" (Graphics Environment Manager) is a complete operating system developed by Digital Research, and is meant to support applications that are portable to other machines. Atari's "XBIOS" (extended BIOS) is meant to support ST-specific capabilities not accessible through GEM.

Additional Background Literature

U.S. Pat. No. 4,589,063, which is hereby incorporated by reference, purports to disclose a "method and apparatus for automatic configuration of a computer system . . . wherein one or more system peripheral or I/O devices can be interfaced to the computer system through I/O boards that plug into a system motherboard. Each of the I/O devices includes a controlling device driver module that operates under a program code stored in a read only memory resident on the I/O board and by which the device driver module allows the computer system to communicate with its associated peripheral and I/O devices. Accordingly, a system user is not required to change the computer operating system kernel to support each new I/O device or system configuration change."

BRIEF DESCRIPTION OF THE DRAWING

The present invention will be described with reference to the accompanying drawings, which show important sample embodiments of the invention and which are incorporated in the specification hereof by reference, wherein:

FIG. 1 diagrams the layout of the extended feature table (XFT) used in the presently preferred embodiment.

FIG. 2 schematically shows an object-oriented paradigm wherein, by viewing every DELL hardware system as a subclass of a generic DELL hardware system class, supporting all extended features across every systems, BIOS programmers can choose to inherit or modify any or all of these features for their particular system.

FIG. 3 shows additional details of the structure of each individual feature entry.

FIG. 6 shows how the XBIOS API library, in the presently preferred embodiment, communicates with the device driver via the I/O control API supplied by the operating environment.

DESCRIPTION OF THE PREFERRED EMBODIMENTS

Figure 4:
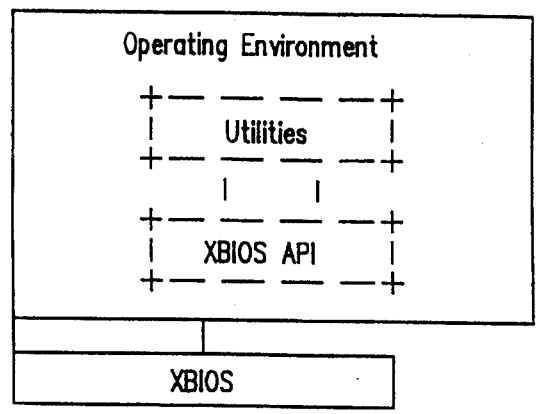
FIG. 4 shows how a pointer is used to allow BIOS programmers to relocate the feature table, and enables uniform access to the table regardless of the Dell system type.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In particular, the following text frequently references the "XBIOS" system software, which is the presently preferred embodiment of the claimed system extension software. The following text also makes frequent references to Dell™ computers, since the preferred embodiment of the system extension software has been implemented in this line of computers. However, of course, the claimed inventions can readily be adapted to a tremendous range of computers and of software implementations.

Even the specific disclosed embodiment is not inherently limited to Dell computers, but provision for other maker's computers, of comparable architecture, can readily be added.

Preferred Embodiment: Family of Computers with Shared General Architecture

The disclosed innovations have been implemented on a number of different computer systems within the Dell system product line. As of the effective filing date of the present application, these include both EISA and ISA systems; systems based on 80486, 80386, and 386SX microprocessors; systems running at 33 MHz, 25 MHz, and 20 MHz clock rates: systems with one or two hard disks, or up to 10 disks in a drive array; systems with monochrome, VGA, or high-resolution graphics adapters: and a wide variety of other configuration options. Moreover, the disclosed innovations are currently being made available in all new Dell computer designs. Thus, it is expected that, in the near future, every computer in the Dell product family will include the XBIOS described below (or an update thereof).

As discussed below, the disclosed innovations are believed to be advantageous not only as applied to a single computer, but also as applied to a whole family of computers. In the case of the preferred embodiment, suppliers of computer peripherals can be increasingly confident that a device driver which takes advantage of the self-describing system software extension of the presently preferred embodiment will apply to every current Dell computer, and also to future models which the supplier has not yet seen or heard of.

A sample source code implementation is set forth in the Appendix to insure the fullest possible compliance with the best mode requirements of U.S. patent law. Although the sample source code does represent the state of this code as of the effective filing date of the present application, it must be noted that this specific example is still under development. It is expected that this source code will later be modified to add functionality, improve performance, and possibly also to remove bugs.

To give a more clear example of the workings and advantages of the disclosed innovative system and method ideas, the following is an excerpt from an OS/2 loader that uses several XBIOS features. This code includes the following functions (in several modules):

Check for existence of XBIOS table in system BIOS (EPROM);

Looks for SYSTEM—IDENTIFY routine (find_xbios_ routine);

Call SYSTEM_IDENTIFY routine in EPROM:

Save the data returned by SYSTEM_IDENTIFY for later use;

Look for OS/2_INIT routine (in EPROM), and call it if it exists;

Look for the SMARTVU routine, and, if it exists, display "OS/2" on the diagnostic display;

Looks for GATEA20 routine, and, if it exists, save the GATEA20 address (from table) for later use.

Part of the source code shown on Appendix Page A-ii checks for the existence of an XBIOS table.

The source code shown on Appendix Pages A-ii and A-iii checks for the existence of a System Identify Routine.

The source code shown on Appendix Pages A-iii and A-iv checks for the existence of a SmartVu routine, and uses it, if it exists, to display "OS/2".

The source code shown on Appendix Pages A-iv and A-v calls the OS/2 initialization routine, if it exists.

The source code shown on Appendix Pages A-v and A-vi checks for the existence of a Gate-A20 routine, and stores its address, if it exists, for use in switching between real and protected modes.

The source code shown on Appendix Pages A-vi and A-vii scans the XBIOS table in EPROM looking for a requested function id.

To give a more clear example of the workings and advantages of the disclosed innovative system and method ideas, the source code shown on Pages A-vii to A-xii is an excerpt from a DOS keyboard driver.

The source code shown on Appendix Page A-xii swaps the INT 9 vectors.

The source code shown on Appendix Pages A-xiii to A-xiv checks for a key chord which would require a call to XBIOS.

The source code shown on Appendix Pages A-xiv to A-xvi actually handles keystrokes as desired.

To give a more clear example of the workings and advantages of the disclosed innovative system and method ideas, the source code shown on Appendix Pages A-xvi to A-xviii is an excerpt from a DOS memory manager (HIMEM.SYS) that uses XBIOS functions. It looks for the GATE A20 routine in XBIOS and saves the address for later use by the operating system.

To give a more clear example of the workings and advantages of the disclosed innovative system and method ideas, the source code shown on Appendix Pages A-xviii to A-xxvi is a sample XBIOS table definitions in assembler.

To give a more clear example of the workings and advantages of the disclosed innovative system and method ideas, the source code shown on Appendix Pages A-xxvi to A-xxviii is a sample of XBIOS table definitions in C.

To give a more clear example of the workings and advantages of the disclosed innovative system and method ideas, the source code shown on Appendix Pages A-xxviii to A-xxxvii is a sample of XBIOS test code (written in C).

System Software Extension - Technical Specification

The presently preferred embodiment provides a family of "IBM-compatible" computers. In this family, the disclosed innovations are applied to augment the ROM BIOS by self-defining ROM BIOS feature extensions in a manner independent of the operating environment and extends the system software support for disparate hardware features in a standardized fashion. This strategy is the culmination of ideas arising from the necessity to make the access procedure to the BIOS uniform, and thereby reduce the number of releases of Dell supported operating environment, to provide support for extended system features across all system software platforms, to accommodate enhanced diagnostic support, and to obtained standardized access to system services.

Dell computer systems support various ROM BIOS (hereafter referred as "BIOS") extensions that enhance the standard AT architecture providing added value to Dell's customers. Hitherto, a keyboard interface and various DOS utilities have been provided for Dell's customers to access these extended features. However, this access procedure is inadequate for computer systems sold overseas and various operating environments. The keyboard interface is sufficient for DOS only systems sold in the US since these systems, by default, use BIOS to process keystrokes that access extended features. Systems sold outside the US, however, use a memory resident DOS utility, that traps the BIOS INT 9 (keyboard handler) routine in order to process requested services. This utility requires frequent modifications and testing whenever new features are added to hardware systems since the supporting code is imbedded within the utility.

Moreover, operating systems and graphical environments such as OS/2, WINDOWS, and UNIX intercept keystrokes and process them in a manner which bypass the BIOS keyboard handler. Thus the extended features are not available to users via the keyboard in these environments.

Some utilities written for DOS require direct BIOS accessibility, and hence cannot execute in operating environments that prevent direct access. In order to support compatibility with current systems that access extended features via the keyboard, operating environments that place restrictions on BIOS accessibility, and the additional requirement to improve system diagnostic support, a standardized access method to BIOS extended features independent of the operating environment and hardware system is provided.

The disclosed architecture permits access to extended BIOS features independently of the operating environment This is accomplished by letting the features be "self-defining". This refers to the ability of the operating environment) to access features in a manner independent of the hardware system. An extended feature is viewed by the operating environment as an abstract hardware device or service processed by BIOS with its characteristics embedded in BIOS. The operating environment's only reference to the extended feature is through an identifier that is subsequently defined by BIOS.

The centerpiece of this architecture is a table embedded in BIOS that contains a list of extended features supported by the hardware and its respective attributes. Through the use of this table, the operating environment and the extended features are totally isolated from one another. This allows the operating environment to access extended features in a consistent manner independent of the BIOS. Conversely, the extended features can be developed independently of the specific operating environment, since they are redefined by the BIOS in each specific machine.

The table improves upon the current software interrupt access method to BIOS, since this is not supported by all operating environments. OS/2, for example, does not allow this, DOS has a different problem: programmers can generally redefine any software interrupt, which means that access to extended feature support could be cut off by applications or even by users.

By using the disclosed innovations, BIOS programmers can modify extended features without affecting other parts of the architecture. This reduces the need to update vendor source code. Utilities that take advantage of these extended features can be developed independently the operating environment, and thus will have greater portability.

Object-Oriented Paradigm for Feature Inheritance

Figure 9:
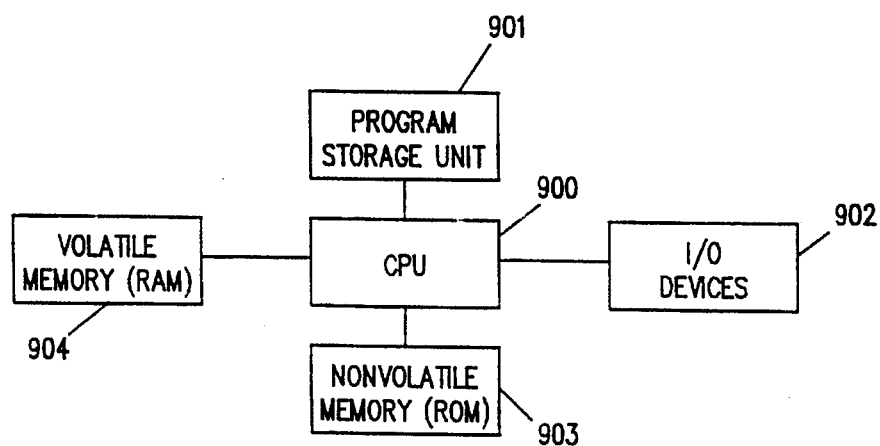
FIG. 9 illustrates a preferred ed embodiment of the present invention.

By utilizing the embedded BIOS table as a method table, the architecture can be developed around an object-oriented paradigm to access the extended features in BIOS. As shown in FIG. 9 by viewing every Dell hardware system as a subclass of a generic Dell hardware system class, supporting all extended features across every systems, BIOS programmers can choose to inherit or modify any or all of these features for their particular system. (Thus, this is only a two-level hierarchy, which avoids problems with "grandchild inheritance.") Each extended feature is assigned a unique identifier. When utility applications need to access this feature, they can use this unique identifier in a message that is dispatched to an interface. This interface subsequently determines the behavior of the extended feature by matching the message to the identifier within the table.

The Self-describing System Software Extension

The "XBIOS" self-describing system software extension contains hardware specific features that extend the standard BIOS operations. An "extended feature" is either a system level routine or data used to service hardware components or to obtain system information unique to Dell hardware systems. Since XBIOS is an extension to BIOS, access to all the standard BIOS functions will remain intact via the interrupt vector table, but an additional access method is provided for the extended features. To implement this access scheme, in the presently preferred embodiment, a table called the extended feature table (XFT) is embedded in BIOS. The XFT is used to match service requests for extended features from the operating environment to identifiers representing the extended features listed in the table. Corresponding attributes associated with each feature identifier determine whether the extended feature is an XBIOS function or a pointer to a block of data. The XFT permits BIOS programmers to define, modify, and support extended features for any system without having support built directly into the operating environment or utilities.

Extended Feature Table ("XFT")

The XFT is a table containing extended system features supported by XBIOS. FIG. 1 diagrams the layout of the XFT. The table consist of a header followed by an array of extended hardware feature entries that can be fragmented throughout XBIOS. The header is composed of a signature used to detect XBIOS support by verifying the existence of the XFT, and the XFT version number.

FIG. 3 shows additional details of the structure of each individual feature entry. Each entry contains at least three fixed members: a feature ID, attribute flags, and a 32-bit XBIOS pointer. Each table may also contain two optional members (as determined by the attribute flag settings): a feature keystroke trigger and an appendix-block of additional data.

The XFT is relocatable, as are all the XBIOS extended features. Anchoring an XFT pointer at the same XBIOS address in all systems provides a standard method of finding the XFT regardless of the system, and allows BIOS programmers the flexibility to locate the table anywhere in XBIOS.

XFT Header

Signature: At header offset 0, the signature ("DELLX-BIOS") is a null terminated string of bytes used to identify, the existence of an XFT confirming that XBIOS is supported by the system.

XFT Version Number: At header offset 2, the XFT version is a 2-byte value used to verify the current XFT version.

XFT Feature Entry

Feature ID: At feature offset 0, the feature ID is a 2-byte value serving as a selector to identify system supported features. The XFT is scanned to match a feature request against the XFT feature ID list. If a match is found then the request is processed. No match indicates that the request is unsupported. Two feature ID's are reserved for XFT support operations: Chain ID and NULL ID. The Chain ID (0xFFFF) is used to indicated that the corresponding 32-bit pointer references the next table fragment in XBIOS. The NULL ID (0x0000) is used as the XFT termination entry.

Attributes: At feature offset 2, the attributes is a 2-byte bit field containing various characteristics about the feature entry. The flags describes the type of the corresponding XBIOS pointer, whether the features supports a DOS compatible keystroke trigger, and determines if the feature entry record contains extended information. The attribute flags are described as follows:

real mode: 1 bit. Real mode code pointer flag.

protect mode: 1 bit. Protected mode code pointer flag.

XBIOS ptr format: 1 bit. Denotes linear or seg:offset.

keystroke trigger: 1 bit. Optional keystroke trigger.

appendix flag: 1 bit. Feature entry has appended data.

To indicate that the corresponding XBIOS pointer references bimodal code, both real mode and protected mode flags are set. If neither the flags are set then it is assumed that the XBIOS pointer references data and an XBIOS address is returned. The pointer format flag indicates the address format. When set, the pointer format is segment:offset: when clear, the pointer format is linear.

XBIOS Pointer: At feature offset 4, the XBIOS pointer is a 32-bit pointer that references either code or data depending upon the corresponding attribute flag settings. If the real mode or protected mode flag is set then the pointer contains an XBIOS feature routine entry point. If the data mode is set then the pointer simply contains an address to a block of data. The XBIOS pointer is either a linear address or an address of segment:offset form. Whenever there is a conflict between the usage of either address format, segment:offset should be used since conversion to linear form will always yield a valid address.

Keystroke: A keystroke trigger is used to maintain compatibility, with systems that can access features through the keyboard. Whenever the keystroke trigger attribute flag is set a two byte keystroke field immediately follows the permanent members of the feature entry at offset 8. The keystroke field is a 2-byte field consisting of the keyboard shift state in the high byte and the scan code in low byte. For example, if a keystroke trigger is designated as ctrl-alt-enter, the ctrl and alt state bits are set in the high byte and low byte value is set to hex 1C (enter key scan code).

Appendix: The appendix contains supplemental information attached to the feature entry. This provides greater control and flexibility to XBIOS feature design. The appendix follows either the permanent members of the feature entry record at offset 8, or the keystroke field at offset 10 (if one is designated by the keystroke trigger attribute flag). The first two bytes of the appendix contain the length of the subsequent data block.

XFT Pointer

The XFT pointer is a 32 bit pointer in segment:offset format anchored at the start of the OEM reserved area—location F000:ED00—in XBIOS. This allows BIOS programmers to relocate the XFT and enables uniform access to the table regardless of the Dell system type (FIG. 4). XFT isolates BIOS programmers and reduces the impact from changes made to XBIOS. This isolation allows BIOS programmers to continue to deploy the development environment that comply best with their needs. XFT requires only the extended features supported by the system and BIOS programmers can add or remove features as desired.

Standard and Genetic Interface Configurations

Figure 5:
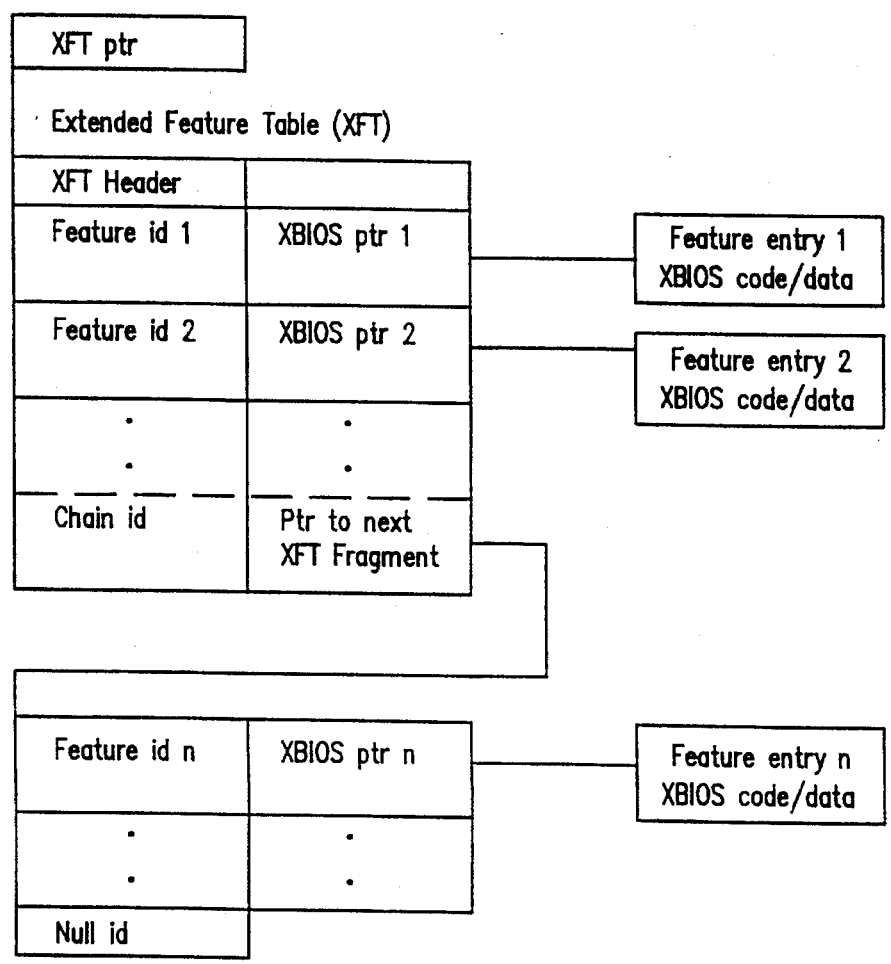
FIG. 5 shows how the feature table interface in the application interface (API) library, in the presently preferred embodiment, locates XBIOS features and executes self-describing system software extension feature routines.

The XBIOS interface is organized into two configurations: standard and generic. In the standard XBIOS interface configuration, which is used in the presently preferred embodiment, direct access to XBIOS is provided by the XBIOS API library that is linked to the utility application. The library, contains an XFT interface that locates XBIOS features and executes XBIOS feature routines (FIG. 5). In the generic XBIOS interface configuration, access to XBIOS is accomplished indirectly through a device driver that contains the XFT interface. The XBIOS API library communicates with the device driver via the I/O control API supplied by the operating environment (FIG. 6).

Generic Interface through API

In this alternative version, access to XBIOS is provided via an application programming interface (API) used by utilities. Utilities are applications that interact with users and need control of the system-dependent features. The XBIOS API corresponds to the features provided by XBIOS and is consistent among all operating environments and Dell computer systems. By restricting the access to XBIOS only through the API, portable system dependent utilities can be developed in a machine independent style with a high level language. The utilities thus developed will be portable to other operating environments and to other Dell systems. This also permits the XBIOS interface to be organized into various configurations based upon the strategy that best supports the operating environment and customers needs.

Access to XBIOS Feature Routines

XBIOS feature routines are machine specific functions embedded in the ROM BIOS of each hardware system. The XFT interface executes feature routines indirectly using the XBIOS feature pointer when either the real or protect attribute flag is set. The routines must adhere to a standardize XBIOS function call protocol. This protocol enables the XFT interface to call any XBIOS function in a uniform manner.

Each routine defines a set of input and output variables that are passed to and from the feature routine via a parameter buffer and returns a status value back to the XFT interface. Routines can optionally define subfunctions under a single feature ID which are executed through a subfunction identifier also placed in the parameter buffer. XBIOS internal variables are defined within the routine's code segment (usually in segment F000h), and addressability is obtained by assigning the data segment register (DS) to the code segment register (CS).

Upon entry, the XBIOS routine assigns DS to CS (after saving DS on the stack), and receives a pointer to the parameter buffer in ES:BX. The input variables within the parameter buffer are addressed incrementally from ES:BX followed by the output variables and the optional subfunction identifier. Various status flag are passed to the routine in the AX register that can be used to convey information such as the processor modes (real/protected; USE16/USE32). One alternative which was dropped from the presently preferred embodiment was to use the system XFT interface stack for parameter variables. This would have allowed a "C" language interface to the XBIOS routines. Due to the possible stack addressing discrepancies from the base pointer (BP) in the USE16 and USE32 address modes of the processor, the current model using ES:BX was chosen. However, as 32-bit architecture and operating environments become increasingly standard, it may be advantageous to implement such alternative XBIOS routines to support the "C" language interface.

Figure 7:
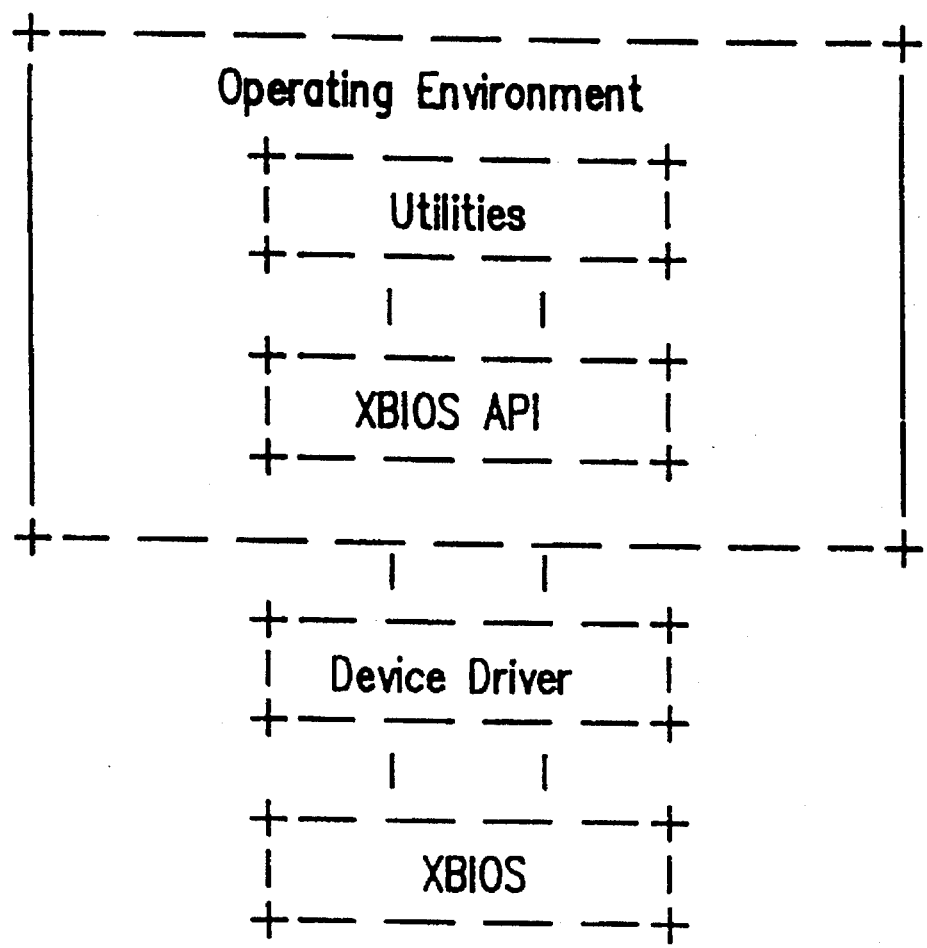
Fig. 7 shows a typical XBIOS feature routine organization.

Upon exit, the XBIOS routine returns successful (zero) or failure (non-zero) status in AX and restores the DS register. FIG. 7 shows a typical XBIOS feature routine organization.

The XBIOS feature routine interface provides input and output parameters to be passed in a buffer referenced by ES:BX, and includes a subfunction identifier for features containing multiple routines. An XBIOS routine sets up DS addressability and returns the status in the AX register.

Specific XBIOS Features in the Presently Preferred Embodiment

XBIOS "features" are extensions to standard BIOS that support hardware extensions. A feature is either a hardware routine or data that is embedded into XBIOS. The following list describes various XBIOS features:

Identify: Identifies the current system

Setup Entry: Entry point to the ROM based setup program: optional keystroke trigger via ctrl-alt-enter.

Toggle Speed: Selects the next speed setting; optional keystroke trigger via ctrl-alt-backslash.

Speed: Set of routines to handle the system speed
Returns the number of system speed settings.
Returns the current speed setting.
Sets the system speed.

Reverse Video: Reverses the monitor video attributes; optional

Keystroke Trigger: via ctrl-alt-backspace.

Monitor Toggle: Toggles between video monitors: optional keystroke trigger via ctrl-alt-F11.

Contrast: Set video contrast; optional keystroke trigger via ctrl-alt-F12.

Shadow RAM: Enable/Disable Shadow Ram

EMS: Enable/Disable EMS

Standby: Enable/Disable Standby

Gate A20: Used to set up fast gate A20.

Diagnostics: Entry point to memory diagnostic routines.

Battery: Returns the Battery Voltage Level

SmartVu: Controls the SmartVu device The SmartVu device is a very small character display in the computer chassis, which is used, under low-level control, to output status and diagnostic messages.

Password: Set/Alter the system password

Peripheral: Enables/Disable peripheral devices

Reset: Controls the Reset Button

Speaker: Controls the speaker volume

OS2Init: Machine specific initialization/ or OS/2.

Of course, the disclosed innovative system architecture can be used to add other such features if desired.

Further Modifications and Variations

It will be recognized by those skilled in the art that the innovative concepts disclosed in the present application can be applied in a wide variety, of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the set of extended features can readily be expanded. One way to use this capability is to provide the user with additional debug functions which can be used to interrupt the application software, as desired, to monitor register values, memory usage, etc.

Another advantageous use of the extended feature routines is for dial-up diagnostics (and/or debug). One example of a hardware configuration which is suitable for such dial-up operation is disclosed in published PCT application WO 90/06548, which is hereby incorporated by reference: but of course other hardware configurations can be used instead.

The contemplated primary advantage of the self-describing system software extension feature routines provided by the present invention is for system-operate functions, such as those listed above, but the capabilities of the disclosed architecture can also be exploited advantageously by device drivers for third-party-peripherals. For example, a power-hungry peripheral in a small portable computer can use an XBIOS call to check the battery status before initiating a high-current operation.

For another example, many application developers are struggling with the problem of the range of installed hardware capabilities. Business software may run on a wide range of "IBM-compatible" machines. Even if very, old or very low-end machines are excluded, a commercial package such as WordPerfect™ or Paradox™ may be expected to run on anything from an 8-MHz 80286 ISA EGA machine with a crowded 40 msec disk to a 50-MHz 80486 EISA TIGA machine with a disk drive array. This range of machines will provide more than an order of magnitude difference in real-world performance, which poses a dilemma for application software developers: the features which provide product differentiation, and which run well on high-end machines, will completely bog a lesser machine. Some vendors have responded to this problem by preparing scaled-down versions of their current primary products, to permit operation on machines with less power (such as 8088- or 80286-based portable machines). However, this presents more difficulty in product distribution and support. One way to advantageously exploit the disclosed innovations is for such application software (at installation or startup, or on user command) to use the extended feature table to find out the basic system configuration, and modify its own software configuration or installation accordingly.

Figure 8:
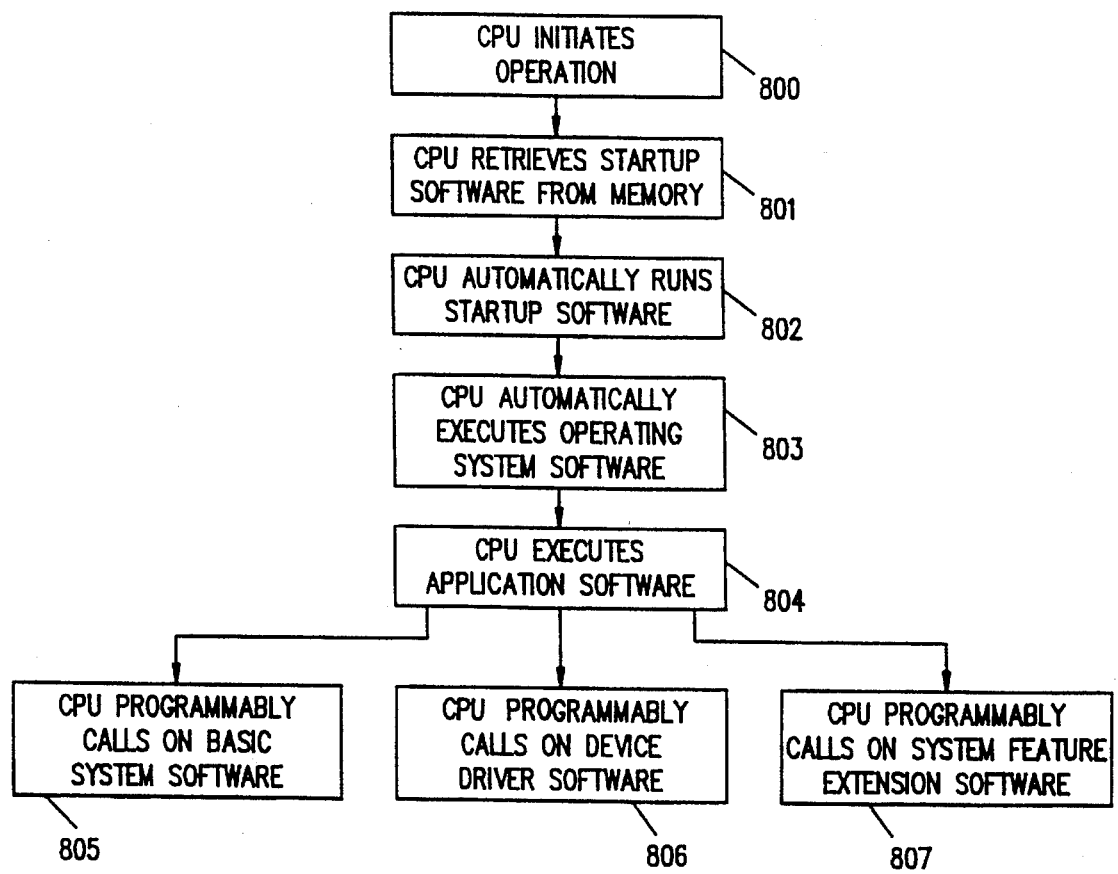
FIG. 8 diagrams a flow chart of an implementation of the preferred embodiment of the invention.

The disclosed innovations have been described with primary reference to a uniprocessor CPU, but they can also be advantageously applied to multiprocessor systems. Referring to FIG. 8, there is illustrated a flow chart depicting a preferred embodiment of the present invention. At step 800, the CPU initiates operation. Next, at step 801, the CPU retrieves the startup software from nonvolatile memory. Thereafter, at step 802, the CPU automatically begins running the startup software on the CPU including self-test and bootstrap software. Next, at step 803, from execution of the startup software, the CPU launches into execution of the operating system software. At step 804, from execution of the operating system software, the CPU launches into execution of the application software. The CPU, under control of the application software, may programmably call on the basic system software (step 805) from the nonvolatile memory to interface to an I/O device according to a format which is substantially independent of the type of hardware being used within the computer system.

The CPU may also proceed to step 806 where, under control of the application software, it programmably calls on device driver software to interface with an I/O device according to a format which is substantially independent of the computer system hardware. Also, the CPU may proceed to step 807 where, under control of the operating system software it programmably calls on machine-specific system feature extension software to provide a low-level interface to electrical operations. The system feature extension software is partly stored in nonvolatile memory and contains a self-describing feature table and a plurality of machine-dependent routines which can be executed by the CPU. Note that device driver programs are also able to make calls to the machine-dependent routines which are dependent upon data in the self-describing feature table.

Referring next to FIG. 9, there is illustrated a preferred embodiment of the present invention whereby CPU 900 is coupled to program storage unit 901 from where CPU 900 can read and programmably execute application software programs. CPU 900 is also coupled to I/O devices 902, which include at least one input device and at least one output device. CPU 900 is also coupled to nonvolatile memory (ROM) 903 which contains basic system software at addresses which are accessible by application software programs to provide translation for at least some input and output operations. Startup software stored within nonvolatile memory 903 is called up by CPU 900 whenever CPU 900 initially commences operation. Operation system software configured within either or both nonvolatile memory 903 and volatile memory 904, which is also coupled to CPU 900, is executed by CPU 900 after the startup software is launched. The operating system software allows a user to command the CPU to begin execution of application software programs.

System feature extension software is also stored in nonvolatile memory 903. The system features extension software contains a plurality of machine-dependent routines and a self-describing feature table which contains pointers to the machine-dependent routines. Multiple device driver programs each accessible by the application software programs running on the CPU define a software interface to specific features of at least one of the I/O devices. The device driver programs are able to make calls to the machine-dependent routines which are dependent upon data in the self-describing feature table.

As will be recognized by those skilled in the art, the innovative concepts described in the present application can be modified and varied over a tremendous range of applications, and accordingly the scope of patented subject matter is not limited by any of the specific exemplary teachings given.

```
;/******************************************************************/    ;A03
;/* Check for existence of XBIOS                                  */      ;A03
;/******************************************************************/    ;A03
getmaker:                                                                 ;A03
        mov     cx, XFT_SIGNLEN         ;load signature length            ;A03
        lea     di, xbhdr.xft_signature ;load addr of signature           ;A03
        assume  es:dgroup                                                 ;A03
        mov     ax, ds                  ;                                 ;A03
        mov     es, ax                  ; es -> dgroup                    ;A03
        assume  ds:nothing                                                ;A03
        lds     si, PXFTADDR            ;ds:si -> @ of ptr to xft         ;A03
        lds     si, ds:[si]             ;ds:si -> @ of xft                ;A03
        repz    cmpsb                   ;check for signature match        ;A03
        jz      init_xbios              ;Jump if supported                ;A03
        jmp     init_no_xbios           ; jump to old mach_id stuff       ;A03
;
; XBIOS exists - use it for initialization
;
init_xbios:                                                               ;A03
        mov     xbstatus, 1             ; XBIOS exists                    ;A03
        add     si, WORDLEN             ; adjust pointer to entries       ;A03
        push    si                      ; save as input to find_xbios_    ;A03
        push    ds                      ;                                 ;A03
;

; Locate System Identify Routine
;
        mov     ax,XB_SYSTEM_IDENTIFY   ; find system identify entry      ;A03
        call    find_xbios_entry        ;                                 ;A03
        mov     bx, offset si_data      ; es:bx -> return data area       ;A03
        call    ds:[si].xft_ptr         ; call xbios routine              ;A03
;
```

```
;       fill in mach_packet from returned model string and bios revision
;
        push    es                          ;                                       ;A03
        pop     ds                          ;                                       ;A03
        mov     di, offset dgroup:mach_packet.model  ; es:di @ mach packet ;A03
        mov     si, offset si_data.system   ; ds:si @ of returned string  ;A03
xbgetchars:                                                                         ;A03
        lodsb                                                                       ;A03
        cmp     al, 00h                     ; copy until 0 encountered              ;A03
        jz      xbgetrev                    ; done, go get bios rev                 ;A03
        stosb                                                                       ;A03
        loop    xbgetchars                  ; loop until done                       ;A03
xbgetrev:
        mov     di, offset dgroup:mach_packet.rom   ; es:di @ mach packet ;A03
        mov     byte ptr es:[di],"P"        ; Phoenix BIOS                          ;A03
        inc     di                          ; point to next char                    ;A03
xbgetrevchar:                                                                       ;A03
        lodsb                               ; ds:si @ of returned BIOS rev          ;A03
        cmp     al, 00h                     ; copy until 0 encountered              ;A03
        jz      xbsys_init                  ; done                                  ;A03
        stosb                                                                       ;A03
        loop    xbgetrevchar                ; loop until done                       ;A03
;
; Locate OS/2 init routine
;
xbsys_init:                                                                         ;A03
        mov     ax,XB_OS2INIT               ; find OS2 machine init routine;A03
        call    find_xbios_entry            ;                                       ;A03
        cmp     ax,0FFFFh                   ; found?                                ;A03
        je      smartvu                     ; no - skip machine init                ;A03
        call    ds:[si].xft_ptr             ; call OS2 init routine                 ;A03
;

; Locate SmartVu routine
;
```

```
smartvu:                                                                        ;A03
        mov     ax,XB_SMARTVU_ON_OFF    ; find SmartVu On/Off routine   ;A03
        call    find_xbios_entry        ;                               ;A03
        cmp     ax,0FFFFh               ; found?                        ;A03
        je      CheckPanther            ; no - skip smartvu init        ;A03
;
;       Turn On SmartVu (prevent BIOS from overwriting what we do...)
;
        push    es                      ; save our data segment         ;A03
        mov     ax, XB_SMARTVU_ON       ; turn on SmartVu               ;A03
        push    ax                      ; push as input to XBIOS        ;A03
        push    ss                      ;                               ;A03
        pop     es                      ; set es:bx to @ of input parm  ;A03
        mov     bx, sp                  ;                               ;A03
        call    ds:[si].xft_ptr         ; call SmartVu on/off routine   ;A03
        pop     ax                      ; realign stack                 ;AC3
        pop     es                      ; restore es                    ;A03
;
;       Write "OS/2" to SmartVu
;
        mov     ax,XB_SMARTVU           ; find SmartVu Write routine    ;A03
        call    find_xbios_entry        ;                               ;A03
        cmp     ax,0FFFFh               ; found?                        ;A03
        je      CheckPanther            ; no - shouldn't happen         ;A03
        mov     bx, offset smvu_data    ; es:bx -> data to write        ;A03
        call    ds:[si].xft_ptr         ; call xbios routine            ;A03
        jmp     GateA20                 ; go setup Gate A20             ;A03
;

;       call OS2 system init routine (use model byte as index)
;
CheckPanther:                                                                   ;A03
        mov     al, si_data.modelbyte   ; al <- model number            ;A03
        cmp     al,System_325D333D      ; Panther?                      ;A03
        jne     GateA20                 ; no - skip this                ;A03
        mov     ah,0                    ;                               ;A03
        mov     bx,SIZE_OF_DELLMACH     ;                               ;A03
```

```
        imul    bx                      ; multiply by size of structure  ;A03
        mov     si, offset dgroup:DELLMACHS                              ;A03
        add     si, ax                  ; ds:si a of machine record      ;A03
        call    es:[si+17]              ; call machine init routine      ;A03
;

; Locate Gate A20 XBIOS routine
;
GateA20:                                                                 ;A03
        mov     ax,XB_A20               ; find system Gate A20 entry     ;A03
        call    find_xbios_entry        ;                                ;A03
;
;       set OS/2 gate A20 address to XBIOS A20 routine shell
;
        mov     ax, offset DHA20_xbios  ; offset of gate A20 routine     ;A03
        mov     _A20,ax                 ; store it                       ;A03
;
;       save address of XBIOS GATEA20 routine for real & prot mode
;       (prot mode selector generated on first A20 call - see DHMODESW.ASM)
;
        mov     di, offset fpXbiosA20real   ; es:di -> real mode call a  ;A03
        add     si,4                    ; ds:si -> XFT routine address   ;A03
        movsw                           ; store offset                   ;A03
        movsw                           ; store segment                  ;A03
        mov     di, offset fpXbiosA20prot.offs ; es:di -> prot mode offset ;A03
        mov     ax, es                  ; restore ds                     ;A03
        mov     ds, ax                                                   ;A03
        mov     si, offset fpXbiosA20real.offs ; ds:si -> real mode offset ;A03
        movsw                           ; store prot mode offset         ;A03
;
; Time to leave....
;
        pop     ax                      ; make stack right...            ;A03
        pop     ax                      ; (was saved ds:si for find_xbios) ;A03
```

```
        jmp     exit_mach_id            ; go to exit                            ;A03
```

```
;/*******************************************************************/;A03
;/*                                                                 */;A03
;/* ROUTINE NAME: find_xbios_entry                                   */;A03
;/*                                                                 */;A03
;/* INPUT:                                                           */;A03
;/*      starting address of XBIOS feature table on stack...         */;A03
;/*      ax <- XBIOS id to locate                                    */;A03
;/*                                                                 */;A03
;/* OUTPUT:                                                          */;A03
;/*      ds:si <- a of XBIOS feature table entry for id              */;A03
;/*      ax = -1 (FFFF) means id not found                           */;A03
;/*******************************************************************/;A03
        assume  ds:nothing, es:dgroup                                  ;A03
find_xbios_entry proc near                                             ;A03
        pop     cx              ; pop return address                   ;A03
        pop     ds              ; ds:si -> start of XFT entries        ;A03
        pop     si              ;                                      ;A03
        push    si              ; save on stack for next call...       ;A03
        push    ds              ;                                      ;A03
        push    cx              ; put return address back on stack     ;A03
init_feature_loop:                                                     ;A03
        cmp     ds:[si].xft_id, XB_NULL   ;are we at the end of XFT?   ;A03
        je      init_loop_error           ;yes, break; ERROR           ;A03
        cmp     ds:[si].xft_id, XB_CHAIN  ;is XFT chain id located?    ;A03
        jne     init_found_id             ;If not - we found an id     ;A03
        lds     si, ds:[si].xft_ptr       ;set next xft block          ;A03
        jmp     SHORT init_feature_loop   ;continue search             ;A03
;                                                                      ;A03
;* we've found an ID, is it the one we wanted?                         ;A03
;                                                                      ;A03
init_found_id:                                                         ;A03
        cmp     ds:[si].xft_id,ax         ;is the id the one we want?  ;A03
        je      init_loop_exit            ;yes, we're done             ;A03
```

```
            mov      bx, XFT_FEATURELEN            ;sizeof(feature) to bx        ;A03
            test     ds:[si].xft_attr, MASK keyb   ;is keystroke trigger?        ;A03
            jz       init_check_appx               ;if not check for appendix    ;A03
            add      bx, XFT_KEYBLEN               ;add length of keyb to bx     ;A03
init_check_appx:                                                                 ;A03
            test     ds:[si].xft_attr, MASK appx   ;is there an appendix?        ;A03
            jz       init_calc_next_id             ;if not calc next id addr     ;A03
            add      bx, ds:[si].[bx]              ;add appendix length to bx    ;A03
            add      bx, XFT_APPXLENFLD            ;add size(appx_len_field)     ;A03
init_calc_next_id:                                                               ;A03
            add      si, bx                        ;locate next id               ;A03
            jmp      init_feature_loop             ;continue table scan          ;A03
init_loop_exit:                                                                  ;A03
            ret                                                                  ;A03
init_loop_error:                                                                 ;A03
            mov      ax,0FFFFh                                                   ;A03
            jmp      init_loop_exit                                              ;A03
find_xbios_entry endp                                                            ;A03

PAGE     ,132
            TITLE    PC DOS KEYB Command  -  Dell feature support
;************************************************************************
;*                                                                       *
;*  DELLKEYB -- Dell hardware feature support                            *
;*                                                                       *
;*                                                                       *
;*  Copyright (C) 1991 Dell Computer Corporation                         *
;*                                                                       *
;************************************************************************
            INCLUDE  postequ.inc
            EXTRN    SHIP_IT:NEAR
            EXTRN    mach_id:NEAR
CODE        SEGMENT PUBLIC 'CODE'
            ASSUME  CS:CODE,DS:NOTHING
```

```
                PUBLIC init_Dell        ;Initialize Dell-specific functions
                PUBLIC int9_swap        ;Temporarily exchange INT9 handlers
                PUBLIC Dell_key         ;Handle ^-alt-keys on all Dell systems
xb_signature    db 'DELLXBIOS',00       ;XBIOS signature string & len
xb_sig_len      equ 10
max_keys        equ 32                  ;table sized for n key codes
key_count       dw ?                    ;# of codes logged in table
key_codes       dw max_keys dup (?)     ;ctl-alt codes handled by XBIOS
key_handlers    dw max_keys*2 dup (?)   ;far addresses of XBIOS handlers
current_funct   db ?                    ;re-entry avoidance flag
ofs_int9        dw ?                    ;old INT9 handler address
seg_int9        dw ?
setup_F         dd 0f0000100h           ;F000-based ROM setup
setup_E8        dd 0e8000100h           ;E800-based ROM setup
speed_toggle    dd 0f000ff60h           ;ROM-based speed toggle
monitor_toggle  dd 0f0000104h           ;ROM-based laptop monitor toggle
contrast_toggle dd 0f000ff86h           ;ROM-based laptop contrast toggle
video_toggle    dd 0f000ff82h           ;ROM-based laptop reverse video toggle
                PUBLIC Mach_Type
                PUBLIC BIOS_VER
                PUBLIC Setup_Addr
                PUBLIC LT_System
Mach_Type       db ?
BIOS_VER        db ?
Setup_Addr      db ?
LT_System       db ?
DELL            equ 1                   ;machine type
NON_DELL        equ 0
PNX_BIOS        equ 1                   ;bios version
PCL_BIOS        equ 0
F_BLOCK         equ 1                   ;setup addr
E8_BLOCK        equ 0
DELL_LAPTOP     equ 1                   ;laptop flag (LCD monitor)
NOT_DELL_LAPTOP equ 0
ENT_KEY         equ 01CH                ;Enter key used for Setup
BS_KEY          equ 02BH                ;Backslash key for Speed Switch
B_KEY           equ 00Eh                ;backspace key for reverse video.
F11_KEY         equ 057h                ;F11 key for monitor toggle
F12_KEY         equ 058h                ;F12 key for contrast.

CMOS_MC         equ 42h                 ;cmos monitor/contrast byte address
```

```
MT_FLAG         equ 00001000b           ;monitor toggle flag bit
CE_FLAG         equ 00010000b           ;contrast enhancer flag bit cmos_data_port  equ 71h                 ;used for REAL_TIME_CLOCK
cmos_func_port  equ 70h                 ;used for REAL_TIME_CLOCK
ioj_cmos        equ 8                   ;Cmos Ram
iojump          macro   dev
                rept    ioj_&dev
                jmp     $+2
                endm
                endm
;--------------------------------------------------------------------
;
in_cmos_data    PROC NEAR               ;AL -> CMOS byte at AL
                pushf
                cli
                or al,80h
                iojump cmos
                out cmos_func_port,al
                iojump cmos
                in al,cmos_data_port
                push ax
                mov al,00h              ;point to register D
                iojump cmos
                out cmos_func_port,al   ;enable NMI
                iojump cmos
                in al,cmos_data_port    ;requisite read from data port
                pop ax
                popf
                ret
in_cmos_data    ENDP
;****************************************************************
;
swallow_key     PROC NEAR               ;re-enable keyboard
                pushf
                cli
                mov al,20h              ;send end-of-interrupt
                out 20h,al
                mov al,ENA_KBD          ;re-enable keyboard interrupts for
                call SHIP_IT            ;SETUP (DOS 5.0 SHIP_IT doesn't STI!)
                popf
                ret
swallow_key     ENDP
```

```
;****************************************************************
init_Dell       PROC NEAR cld
                push ax
                push bx
                push cx
                push dx
                push bp
                push si
                push di
                push ds
                push es mov cs:key_count,0              ;flag no valid XBIOS keys
                mov cs:current_funct,0          ;flag no handlers executing
                mov ax,0f000h
                mov es,ax
                les di,es:[0ed00h]
                push ds
                push cs
                pop ds
                lea si,cs:xb_signature
                mov cx,xb_sig_len               ;look for XBIOS signature text
                repe cmpsb                      ;at *(F000:ED00)
                pop ds
                add di,2                        ;skip version ID, if present
                jcxz for_feature
go_init_done:   jmp xb_init_done                ;no signature, no XBIOS
xbios_chain:    les di,es:[di+2]                ;handle XFT chain feature...
for_feature:    mov ax,es:[di]                  ;get feature identifier
                add di,2
                cmp ax,0                        ;NULL feature?
                je go_init_done                 ;yes, end of feature table
                cmp ax,65535                    ;CHAIN feature?
                je xbios_chain                  ;yes, go find next fragment...
                mov ax,es:[di]                  ;else get feature attributes
                add di,2
                test ax,00000001b               ;real mode calls accepted?
                jz next_feature                 ;no, can't call it from KEYB!
                test ax,00001000b               ;standard seg:off pointer?
```

```
                jz next_feature            ;no, wouldn't be prudent at
                test ax,00010000b          ;this juncture
                jz next_feature            ;not keystroke, don't record
                mov bx,es:[di+4]           ;get keystroke data
                and bh,11b                 ;both ctrl and alt flags set?
                xor bh,11b                 ;no, key code not accessible
                jnz next_feature           ;from standard KEYB.COM
                mov si,cs:key_count        ;else record the keystroke in
                shl si,1                   ;"quick-reference" table...
                mov cs:key_codes[si],bx
                shl si,1
                mov bx,es:[di]
                mov cs:key_handlers[si],bx ;write far proc offset
                mov bx,es:[di+2]
                mov cs:key_handlers[si+2],bx ;write far proc segment
                inc cs:key_count           ;bump key counter
                cmp cs:key_count,max_keys  ;any more room in table?
                jae xb_init_done           ;no, stop scanning
next_feature:   add di,4                   ;skip handler address
                test al,110000b            ;keystroke or appendix?
                jz for_feature             ;no, nothing else to skip
                mov bx,ax
                and bx,10000b              ;keystroke?
                shr bx,1
                shr bx,1                   ;BX=2 if keystroke present,
                shr bx,1                   ;else 0
                add di,bx
                test ax,100000b            ;appendix?
                jz for_feature
                add di,es:[di]             ;yes, add blocklen+2 to skip
                add di,2
                jmp for_feature
xb_init_done:   mov ax,3509h               ;record current INT9 address
                int 21h                    ;so int9_swap can swap it out
                mov seg_int9,es
                mov ofs_int9,bx
                call mach_id               ;identify other machine
                                           ;characteristics pop es
                pop ds
                pop di
```

```
                pop si
                pop bp
                pop dx
                pop cx
                pop bx
                pop ax
                ret
init_Dell       ENDP ;****************************************************************
int9_swap       PROC NEAR push ax
                push bx
                push cx
                push ds
                push es
                xor ax,ax
                mov ds,ax
                les bx,ds:[9*4]          ;pick up current int 9 vector...
                mov ax,cs:ofs_int9       ;and exchange with vector
                mov cx,cs:seg_int9       ;stored during initialization
                mov cs:seg_int9,es
                mov cs:ofs_int9,bx
                pushf
                cli
                mov ds:[9*4],ax
                mov ds:[9*4+2],cx
                popf
                pop es
                pop ds
                pop cx
                pop bx
                pop ax
                ret
int9_swap       ENDP
```

```
;*****************************************************************
XBIOS_key       PROC NEAR               ;Check for XBIOS ctrl-alt code in AX
                                        ;Call XBIOS & return C=0 if handled
                cmp cs:current_funct,0
                clc                     ;don't allow re-entry into XBIOS
                jne XB_return           ;handlers mov cs:current_funct,1
                push ax
                push bx
                push cx
                push dx
                push bp
                push si
                push di
                push ds
                push es mov cx,cs:key_count
                cmp cx,1
                jb XB_exit              ;no XBIOS keys logged, exit w/C=1
                xor ah,ah
                push cs
                pop es
                mov di,OFFSET cs:key_codes
                mov dx,di
                cld
                repne scasw             ;scan key code table
                stc
                jne XB_exit             ;key not found, exit w/C=1
                sub di,2                ;else point to match
                sub di,dx               ;get table offset *2
                shl di,1                ;*4 to index jump table
                push di
                call swallow_key
                pop di
```

```
                call int9_swap          ;avoid KEYB re-entrancy
                mov ax,40h              ;set DS=40H in case XBIOS wants it
                mov ds,ax
                call DWORD PTR cs:key_handlers[di]
                call int9_swap          ;put KEYB INT9 handler back
                clc                     ;signal XBIOS call accomplished
XB_exit:        pop es
                pop ds
                pop di
                pop si
                pop bp
                pop dx
                pop cx
                pop bx
                pop ax
                mov cs:current_funct,0
XB_return:      ret
XBIOS_key       ENDP ;*****************************************************************
Dell_key        PROC                    ;Try to handle key AL through XBIOS
                                        ;(or BIOS on older Dell/PCL machines)
                push ax
                push bx
                push cx
                push dx
                push bp
                push si
                push di
                push ds
                push es
                call XBIOS_key          ;XBIOS function present?
                jnc key_processed       ;yes, keypress handled
                cmp Mach_Type,DELL
                jne not_Dell_key
                cmp BIOS_VER,PNX_BIOS
                jne not_Dell_key        ;not Dell/Phoenix machine
```

```
                cmp al,ENT_KEY          ;ENTER triggers ROM-based SETUP
                je call_setup
                cmp al,BS_KEY           ;'\' key toggles CPU speed
                je toggle_speed
                cmp LT_System,DELL_LAPTOP
                jne not_Dell_key        ;not a 316LT/320LT, skip other tests
                cmp al,B_KEY            ;backspace key inverts video
                je invert_video
                cmp al,F11_KEY          ;F11 toggles LCD/external monitor
                je toggle_monitor
                cmp al,F12_KEY          ;F12 toggles enhanced LCD contrast
                je toggle_contrast
                jmp short not_Dell_key
key_processed:  db 85h                  ;stc becomes test cx,di; sets C=0
not_Dell_key:   stc                     ;key not handled in BIOS
                pop es
                pop ds
                pop di
                pop si
                pop bp
                pop dx
                pop cx
                pop bx
                pop ax
                ret
call_setup:                             ;Invoke ROM-based SETUP program
                call swallow_key
                call int9_swap          ;ditch the KEYB keypress handler
                cmp Setup_Addr,F_BLOCK
                jne E8_setup
                call [setup_F]          ;far call to SETUP vector
                jmp short end_setup
E8_setup:       call [setup_E8]
end_setup:      call int9_swap          ;restore our INT9 handler
                jmp key_processed
toggle_speed:                           ;Toggle CPU speed
                call [speed_toggle]
                jmp key_processed
invert_video:                           ;Invert LCD video
                call [video_toggle]
```

```
                        jmp key_processed
toggle_monitor:                             ;Select LCD/external monitor
                mov al,CMOS_MC
                call in_cmos_data           ;...but only if option is active
                test al,MT_FLAG
                jz not_Dell_key             ;else ignore key
                call [monitor_toggle]
                jmp key_processed
toggle_contrast:                            ;Toggle LCD contrast enhancement
                mov al,CMOS_MC
                call in_cmos_data           ;...but only if option is active
                test al,CE_FLAG
                jz not_Dell_key             ;else ignore key
                call [contrast_toggle]
                jmp key_processed
Dell_key        ENDP
;*****************************************************************
CODE            ENDS
                END
```

```
;*----------------------------------------------------------------*
;*                                                         *    *
;*    IsDellXBIOS                                                  *
;*                                                         *
 *
;*        Check for Dell XBIOS machines                            *
;*                                                         *    *
;*  ARGS:   None                                                   *
;*  RETS:   AX = 1 if we're on a Dell XBIOS machine, 0 otherwise   *
;*  REGS:   All regs/flags preserved except AX                     *
;*                                                         *    *
```

```
;*         Stores address of XBIOS A20 handler in lpExtA20Handler   *
;*                                                                  *
;* Note: ID method given by Dell Computer Corp.                     *
;*                                                                  *
;*------------------------------------------------------------------* xb_signature    db 'DELLXBIOS',00      ;XBIOS signature string & len
xb_sig_len      equ 10
                PUBLIC IsDellXBIOS
IsDellXBIOS     PROC NEAR
                pushf
                pusha
                push ds
                push es
                cld
                mov ax,0f000h
                mov es,ax
                les di,es:[0ed00h]
                push ds
                push cs
                pop ds
                lea si,cs:xb_signature
                mov cx,xb_sig_len       ;look for XBIOS signature text
                repe cmpsb              ;at *(F000:ED00)
                pop ds
                add di,2                ;skip version ID, if present
                jcxz for_feature
xbios_fail:     clc                     ;no XBIOS A20 handler present
                jmp xb_init_done
xbios_chain:    les di,es:[di+2]        ;handle XFT chain feature...
for_feature:    mov ax,es:[di]          ;get feature identifier
                add di,2                ;index attribute flags
                cmp ax,0                ;NULL feature?
                je xbios_fail           ;yes, end of feature table
                cmp ax,65535            ;CHAIN feature?
                je xbios_chain          ;yes, go find next fragment...
                cmp ax,11               ;A20 feature?
                jne next_feature        ;no, skip it
                mov ax,es:[di]          ;else get feature attributes
                test ax,00001000b       ;standard seg:off pointer?
                jz next_feature         ;no, wouldn't be prudent at
                                        ;this juncture
```

```
                les bx,es:[di+2]
                mov WORD PTR lpExtA20Handler,bx    ;else record handler addr...
                mov WORD PTR lpExtA20Handler+2,es
                stc                                ;...and return OK
xb_init_done:   pop es                             ;C=1 if XBIOS OK, 0 otherwise
                pop ds
                popa
                mov ax,0
                rcl ax,1
                popf
                ret
next_feature:   mov ax,es:[di]                     ;get feature attributes
                add di,6                           ;skip attribs & handler addr
                test al,110000b                    ;keystroke or appendix?
                jz for_feature                     ;no, nothing else to skip
                mov bx,ax
                and bx,10000b                      ;keystroke?
                shr bx,1
                shr bx,1                           ;BX=2 if keystroke present,
                shr bx,1                           ;else 0
                add di,bx
                test ax,100000b                    ;appendix?
                jz for_feature
                add di,es:[di]                     ;yes, add blocklen+2 to skip
                add di,2
                jmp for_feature
IsDellXBIOS     ENDP
```

```
;* XBIOS.INC                                                              *;
;* ---------------------------------------------------------------------- *;
; $Log:   X:/bios/core/xbios/xbios.inv $
;* ---------------------------------------------------------------------- *;
comment ;*
    Include file contains the XBIOS structure declarations for the header
``` and the permanent part of the feature entry. Also included are bit
field records for flag entries and equates for the feature entry id's.
```
;*
;* XFT Header Structure.                                                 *;
xft_header_tag      struc
    xft_signature   db      "DELLXBIOS",0
    xft_version     dw      0100h
xft_header_tag      ends ;* XFT Feature Structure.                                                *;
xft_feature_tag     struc
    xft_id          dw      ?
    xft_attr        dw      ?
    xft_ptr         dd      ?
xft_feature_tag     ends
;* XFT Keystoke Trigger Structure.                                       *;
xft_keyb_tag        struc
    xft_keyb        dw      0
xft_keyb_tag        ends
;* XFT Appendix Structure.                                               *;
xft_appx_tag        struc
    xft_appx        dw      0
    xft_appx_dat    db      ?
xft_appx_tag        ends
;
;* XFT POINTER LOCATION (Offset into F blk).                             *;
XFT_PTR_LOC         equ     0ED00h
XFT_LINR_PTR_LOC    equ     0FED00h
;* XFT LENGTH EQUATES                                                    *;
XFT_HDRLEN          equ     (size xft_header_tag)
XFT_FEATURELEN      equ     (size xft_feature_tag)
XFT_SIGNLEN         equ     (offset xft_version - offset xft_signature)
XFT_KEYBLEN         equ     (size xft_keyb_tag)
XFT_APPXLENFLD      equ     (size xft_appx)
;* XFT FEATURE ATTRIBUTE FLAGS.                                          *;
XATTR_REAL          equ     0000000000000001b   ;xftptr to real mode proc
XATTR_PROT          equ     0000000000000010b   ;xftptr to protect mode proc
XATTR_XXXX          equ     0000000000000100b   ;reserved bit
XATTR_SEGM          equ     0000000000001000b   ;xftptr in seg:off format
XATTR_KEYB          equ     0000000000010000b   ;optional keystroke trigger
XATTR_APPX          equ     0000000000100000b   ;optional appendix
```

```
XATTR_BIMODAL        equ     (XATTR_REAL or XATTR_PROT)
XATTR_DATA           equ     (XATTR_BIMODAL xor XATTR_BIMODAL)
XATTR_LINR           equ     (XATTR_SEGM xor XATTR_SEGM)
XFT_ATTR_FLAGS       record  resv:10=0,appx:1,keyb:1,form:1,xxxx:1=0,prot:1,real:1
;* XFT KEYBOARD TRIGGER SHIFT STATE FLAGS.                                     *;
XKEYB_CTRL           equ     00000001b              ;ctrl key
XKEYB_ALT            equ     00000010b              ;alt key
XFT_KEYB_FLAGS       record  unused:6=0,alt:1,ctrl:1
;
;* ------------------------------------------------------------------------ *;
;* XBIOS FEATURE EQUATES                                                    *;
comment ;*
    The following are equates used to identify XBIOS extended features.
    The XB_NULL and XB_CHAIN entries are reserved. Place new entries before
    the XB_CHAIN and include a short description of the feature and its
    protocol.
;*
;* ------------------------------------------------------------------------ *;
comment ;*
* The NULL feature entry indicates the end of the extended feature table.
;*
XB_NULL              equ     00000h  ;XFT termination identifier
;* ------------------------------------------------------------------------ *;
comment ;*
* FUNCTION: System Identify
* INPUT:   es:bx - points to output stack frame
*          cs,ds - XBIOS routine segment/selector (must be F000 block)
* INPUT STACK FRAME: None
* OUTPUT:  Results are put in output stack frame, which is treated
*          like a buffer. For long names, could be up to 32 bytes long.
*          The first byte stored in the buffer is the Dell system
*          model number (binary), followed by the Dell system revision
*          number (binary). Next is the system name, which is an
*          ASCII string terminated with a zero. Finally, the BIOS
*          version is included, another ASCII string terminated with
*          a zero.
* OUTPUT STACK FRAME:
*          system_id   db 32 dup(?)
;*
XB_SYSTEM_IDENTIFY   equ     00001h
;* ------------------------------------------------------------------------ *;
```

```
comment ;*
 * FUNCTION:
 * INPUT:
 * INPUT STACK FRAME:
 * OUTPUT:
 * OUTPUT STACK FRAME:
;*
XB_SETUP_ENTRY      equ         00002h
;* ------------------------------------------------------------------- *;
comment ;*
 * FUNCTION: Toggle speed
 * INPUT: None
 * INPUT STACK FRAME: No input
 * OUTPUT: None
 * OUTPUT STACK FRAME: No output
;*
XB_TOGGLE_SPEED     equ         00003h
;* ------------------------------------------------------------------- *;
comment ;*
 * FUNCTION: Speed Control and Status
 * INPUT:   es:bx - points to input stack frame
 *          cs    - XBIOS routine segment/selector (must be F000 block)
 * INPUT STACK FRAME:
 * OUTPUT:
 * OUTPUT STACK FRAME:
;*
XB_SPEED_CONTROL    equ         00004h
;* ------------------------------------------------------------------- *;
comment ;*
 * FUNCTION: Toggle black/white video background on portable systems
 * INPUT:  None
 * INPUT STACK FRAME: No input
 * OUTPUT: None
 * OUTPUT STACK FRAME: No output
;*
XB_REVERSE_VIDEO    equ         00005h
;* ------------------------------------------------------------------- *;
comment ;*
 * FUNCTION: Toggle CRT/LCD displays on portable systems
 * INPUT: None
 * INPUT STACK FRAME: No input
```

```
* OUTPUT: None
* OUTPUT STACK FRAME: No output
;*
XB_MONITOR_TOGGLE    equ         00006h
;* ------------------------------------------------------------------ *;
comment ;*
* FUNCTION: Toggle text mode contrast / graphics mode palettes on portables
* INPUT: None
* INPUT STACK FRAME: None
* OUTPUT: None
* OUTPUT STACK FRAME: None
;*
XB_CONTRAST          equ         00007h
;* ------------------------------------------------------------------ *;
comment ;*
* FUNCTION:
* INPUT:
* INPUT STACK FRAME:
* OUTPUT:
* OUTPUT STACK FRAME:
;*
XB_SHADOW_RAM        equ         00008h
;* ------------------------------------------------------------------ *;
comment ;*
* FUNCTION:
* INPUT:
* INPUT STACK FRAME:
* OUTPUT:
* OUTPUT STACK FRAME:
;*
XB_EMS               equ         00009h
;* ------------------------------------------------------------------ *;
comment ;*
* FUNCTION: Disable/enable "Standby" keyboard NMI on portable systems
* INPUT: es:bx - points to input stack frame
* INPUT STACK FRAME: First byte 0 to disable standby key, 1 to enable
* OUTPUT: None
* OUTPUT STACK FRAME: None
;*
XB_STANDBY           equ         0000Ah
XB_STANDBY_DISABLE   equ         0
```

```
XB_STANDBY_ENABLE   equ         1
;* ---------------------------------------------------------------- *;
comment ;*
 * FUNCTION: Enable/Disable A20 Line
 * INPUT:  es:bx - points to input stack frame
 *         cs    - XBIOS routine segment/selector (must be F000 block)
 *         The input stack frame contains the subfunction id:
 *              - 0 means disable A20 line (wrap addresses at 1MB)
 *              - 1 means enable A20 line (allow high memory access)
 * INPUT STACK FRAME:
 *         subfunc  db ?
 * OUTPUT: A20 line enabled/disabled
 * OUTPUT STACK FRAME: None
;*
XB_A20              equ         0000Bh
XB_A20_DISABLE      equ         0
XB_A20_ENABLE       equ         1
;* ---------------------------------------------------------------- *;
comment ;*
 * FUNCTION:
 * INPUT:
 * INPUT STACK FRAME:
 * OUTPUT:
 * OUTPUT STACK FRAME:
;*
XB_DIAGNOSTICS      equ         0000Ch
;* ---------------------------------------------------------------- *;
comment ;*
 * FUNCTION:
 * INPUT:
 * INPUT STACK FRAME:
 * OUTPUT:
 * OUTPUT STACK FRAME:
;*
XB_BATTERY          equ         0000Dh
;* ---------------------------------------------------------------- *;
comment ;*
 * FUNCTION: Output characters on SmartVu device
 * INPUT:  es:bx - points to input stack frame
 *         cs    - XBIOS routine segment/selector (must be F000 block)
 *         The stack frame contains the ASCIIZ string to be displayed
```

```
*         on the SmartVu device. es:bx points to the first character
*         (leftmost) to be displayed.
* INPUT STACK FRAME:
*         string   db  x dup (?)    - ASCIIZ string of any length
* OUTPUT: ASCIIZ string displayed on SmartVu device
* OUTPUT STACK FRAME: None
;*
XB_SMARTVU           equ         0000Eh
;* ---------------------------------------------------------------- *;
comment ;*
 * FUNCTION:
 * INPUT:
 * INPUT STACK FRAME:
 * OUTPUT:
 * OUTPUT STACK FRAME:
;*
XB_PASSWORD          equ         0000Fh
;* ---------------------------------------------------------------- *;
comment ;*
 * FUNCTION:
 * INPUT:
 * INPUT STACK FRAME:
 * OUTPUT:
 * OUTPUT STACK FRAME:
;*
XB_PERIPHERAL        equ         00010h
;* ---------------------------------------------------------------- *;
comment ;*
 * FUNCTION:
 * INPUT:
 * INPUT STACK FRAME:
 * OUTPUT:
 * OUTPUT STACK FRAME:
;*
XB_RESET             equ         00011h ;* ---------------------------------------------------------------- *;
comment ;*
 * FUNCTION: Perform OS/2 Specific Machine Initialization
 * INPUT:  cs - XBIOS routine segment/selector (must be F000 block)
 * INPUT STACK FRAME: None
```

```
* OUTPUT: machine specific actions performed, no data returned
* OUTPUT STACK FRAME: None
;*
XB_OS2INIT          equ         00012h
;* ---------------------------------------------------------------- *;
comment ;*
* FUNCTION: Turn SmartVu On/Off
* INPUT:   es:bx - points to input stack frame
*          cs    - XBIOS routine segment/selector (must be F000 block)
*          The input stack frame contains the subfunction id:
*                 - 0 turns on SmartVu (disbales BIOS writes to SmartVu)
*                 - 1 turns off SmartVu (enables BIOS writes to SmartVu)
* INPUT STACK FRAME:
*          subfunc db ?
* OUTPUT: BIOS updates to SmartVu enabled or disabled
* OUTPUT STACK FRAME: None
;*
XB_SMARTVU_ON_OFF   equ         00013h
XB_SMARTVU_ON       equ         0
XB_SMARTVU_OFF      equ         1
;* ---------------------------------------------------------------- *;
comment ;*
* FUNCTION: Turn system processor cache on/off
* INPUT:    es:bx - points to input stack frame
*           cs    - XBIOS routine segment/selector (must be F000 block)
* INPUT STACK FRAME:
*           status db ?
* OUTPUT: Machine specific actions performed, no data returned
* OUTPUT STACK FRAME:
;*
XB_SYSTEM_CACHE     equ         00014h
XB_SYSCACHE_OFF     equ         0
XB_SYSCACHE_ON      equ         1
;* ---------------------------------------------------------------- *;
comment ;*
* FUNCTION:   Unlock the FE3021 chip
* INPUT:      cs, ds - selector to 0F000h
* INPUT STACK FRAME:
* OUTPUT:     ZF = 1 : Unlock failure
*             ZF = 0 : Unlock O.K
* OUTPUT STACK FRAME:
```

```
;*
xb_unlock              equ        00015h
;* -------------------------------------------------------------- *;
comment ;*
 * FUNCTION: Get/Set Monitor Type, System Video Status
 * INPUT: es:bx - points to input stack frame
 *        cs    - XBIOS routine segment/selector (must be F000 block)
 * INPUT STACK FRAME:
 * OUTPUT:
 * OUTPUT STACK FRAME:
;*
XB_MONITOR_TYPE        equ        00016h
;* -------------------------------------------------------------- *;
comment ;*
    The chain feature entry indicates that the XFT is fragmented and that
    its corresponding XFT pointer references the next fragment.
;*
XB_CHAIN               equ        0FFFFh   ;XFT chain indicator.
;* -------------------------------------------------------------- *;
;---------------------------------------------------------------------
;---------------------------------------------------------------------
```

```
file XBIOS    H      sample XBIOS table definitions in C
//
typedef struct
{
unsigned model_num;
unsigned board_rev;
char name[32];
char bios_version[16];
} sysID;
unsigned get_XFT_version(void);
char far *find_feature(unsigned feature_id);
unsigned system_identify(sysID *ID);
```

```
unsigned get_system_speed(unsigned *speed);
unsigned get_supported_speed_count(unsigned *speed);
unsigned set_system_speed(unsigned speed);
unsigned set_A20(unsigned status);
unsigned set_system_cache(unsigned status);
unsigned rom_setup(void);
unsigned reverse_video(void);
unsigned monitor_toggle(void);
unsigned speed_toggle(void);
unsigned contrast_toggle(void);
unsigned set_standby(unsigned status);
unsigned OS2_init(void);
unsigned write_smartvu(char far *string);
unsigned set_smartvu(unsigned status);
unsigned unlock_3021(void);
unsigned get_monitor_type(unsigned *montype);
unsigned set_monitor_type(unsigned montype);
unsigned get_system_video_status(unsigned *status);
#define XB_SIG_LEN 10
#define XB_NULL 0
#define XB_CHAIN 65535
#define XB_SYSTEM_IDENTIFY 1
#define XB_SETUP_ENTRY 2
#define XB_TOGGLE_SPEED 3
#define XB_SPEED_CONTROL 4
#define XB_REVERSE_VIDEO 5
#define XB_MONITOR_TOGGLE 6
#define XB_CONTRAST 7
#define XB_SHADOW_RAM 8
#define XB_EMS 9
#define XB_STANDBY 10
#define XB_A20 11
#define XB_DIAGNOSTICS 12
#define XB_BATTERY 13
#define XB_SMARTVU 14
#define XB_PASSWORD 15
#define XB_PERIPHERAL 16
#define XB_RESET 17
#define XB_OS2INIT 18
#define XB_SMARTVU_ON_OFF 19
#define XB_SYSTEM_CACHE 20
```

```c
#define XB_UNLOCK_3021 21
define XB_MONITOR_TYPE 22 file XAPI     C     Sample XBIOS test code in C
/**********************************************************/
/*                                                          */
/* XAPI -- Turbo C++ XBIOS application program interface   */
/*                                                          */
/* Compile with Turbo C++ v1.0 or later, medium model      */
/*                                                          */
/*                                                          */
/**********************************************************/
#pragma inline
#include <stdio.h>
#include <dos.h>
#include <stdlib.h>
#include <alloc.h>
#include "xbios.h"
/**********************************************************/
unsigned get_XFT_version(void)
{
   unsigned XFT_vers;
   static char xb_signature[] = ("DELLXBIOS");
   asm{
      mov ax,0f000h; mov es,ax; les di,es:[0ed00h];
      lea si,xb_signature; mov cx,XB_SIG_LEN; cld; repe cmpsb;
      jne not_valid;
      mov ax,es:[di]; mov XFT_vers,ax;
      }
   return XFT_vers;
not_valid:
   return 0;
}
/**********************************************************/
```

```c
char far *find_feature(unsigned feature_id)
{
    char far *pntr = NULL;
    asm{
        mov ax,0f000h; mov es,ax; les di,es:[0ed00h];
        add di,XB_SIG_LEN+2;
        }
cmp_loop:
    asm{
        mov ax,es:[di]; add di,2;
        cmp ax,feature_id; je found;
        cmp ax,XB_NULL; je eot;
        mov ax,es:[di]; add di,6;
        test al,110000b; jz cmp_loop;
        mov bx,ax; and bx,10000b; shr bx,1; shr bx,1; shr bx,1; add di,bx;
        test al,100000b; jz cmp_loop;
        mov ax,[di]; add di,2; add di,ax; jmp cmp_loop;
        }
found:
    asm{
        mov ax,es:[di]; add di,2;
        and ax,1000b; jz linear_ptr;
        les di,es:[di];
        mov WORD PTR pntr,di; mov WORD PTR pntr+2,es;
        jmp eot;
        }
linear_ptr:
    asm{
        mov ax,es:[di+2]; mov ah,al; xor al,al; mov cl,4; shl ax,cl; mov es,ax;
        mov di,es:[di];
        mov WORD PTR pntr,di; mov WORD PTR pntr+2,es;
        jmp eot;
        }
eot:
    return pntr;
}
/*************************************************************/
unsigned system_identify(sysID *ID)
{
    unsigned char buffer[32];
    char far *feature;
```

```c
    if ((feature=find_feature(XB_SYSTEM_IDENTIFY)) == NULL)
        return 0;
    asm{
        push ss; pop es; lea bx,buffer;
        push ds; push si; push di; push bp; mov ax,0f000h; mov ds,ax;
        call DWORD PTR [feature];
        pop bp; pop di; pop si; pop ds;
        }
    ID->model_num=buffer[0];
    ID->board_rev=buffer[1];
    strcpy(ID->name,&buffer[2]);
    strcpy(ID->bios_version,&buffer[3+strlen(&buffer[2])]);
    return 1;
}
/**************************************************************/
unsigned get_system_speed(unsigned *speed)
{
    char far *feature;
    unsigned char fn[4];

if ((feature=find_feature(XB_SPEED_CONTROL)) == NULL)
        return 0;
    fn[3] = 0;
    asm{
        push ss; pop es; lea bx,fn;
        push ds; push si; push di; push bp;
        mov ax,40h; mov ds,ax;
        call DWORD PTR [feature];
        pop bp; pop di; pop si; pop ds;
        cmp ax,0; jne error;
        }
    *speed = fn[2];
    return 1;
error:
    return 0;
}
/**************************************************************/
unsigned get_supported_speed_count(unsigned *speed)
{
    char far *feature;
    unsigned char fn[4];
```

```c
    if ((feature=find_feature(XB_SPEED_CONTROL)) == NULL)
        return 0;
    fn[3] = 0;
    asm{
        push ss; pop es; lea bx,fn;
        push ds; push si; push di; push bp;
        mov ax,40h; mov ds,ax;
        call DWORD PTR [feature];
        pop bp; pop di; pop si; pop ds;
        cmp ax,0; jne error;
        }
    *speed = fn[1];
    return 1;
error:
    return 0;
}
/**********************************************************/
unsigned set_system_speed(unsigned speed)
{
    char far *feature;
    unsigned char fn[4];

if ((feature=find_feature(XB_SPEED_CONTROL)) == NULL)
        return 0;
    fn[3] = 1;
    fn[0] = speed;
    asm{
        push ss; pop es; lea bx,fn;
        push ds; push si; push di; push bp;
        mov ax,40h; mov ds,ax;
        call DWORD PTR [feature];
        pop bp; pop di; pop si; pop ds;
        cmp ax,0; jne error;
        }
    return 1;
error:
    return 0;
}
/**********************************************************/
unsigned set_A20(unsigned status)
```

```c
{
    char far *feature;

if ((feature=find_feature(XB_A20)) == NULL)
        return 0;
    asm{
        push ss; pop es; lea bx,status;
        push ds; push si; push di; push bp;
        call DWORD PTR [feature];
        pop bp; pop di; pop si; pop ds;
        }
    return 1;
}
/**************************************************************/
unsigned set_system_cache(unsigned status)
{
    char far *feature;

if ((feature=find_feature(XB_SYSTEM_CACHE)) == NULL)
        return 0;
    asm{
        push ss; pop es; lea bx,status;
        push ds; push si; push di; push bp;
        call DWORD PTR [feature];
        pop bp; pop di; pop si; pop ds;
        }
    return 1;
}
/**************************************************************/
unsigned rom_setup(void)
{
    char far *feature;

if ((feature=find_feature(XB_SETUP_ENTRY)) == NULL)
        return 0;
    asm{
        push ds; push si; push di; push bp;
        call DWORD PTR [feature];
        pop bp; pop di; pop si; pop ds;
        }
    return 1;
```

```c
}
/**************************************************************/
unsigned reverse_video(void)
{
    char far *feature;

if ((feature=find_feature(XB_REVERSE_VIDEO)) == NULL)
        return 0;
    asm{
        push ds; push si; push di; push bp;
        call DWORD PTR [feature];
        pop bp; pop di; pop si; pop ds;
        }
    return 1;
}
/**************************************************************/
unsigned monitor_toggle(void)
{
    char far *feature;

if ((feature=find_feature(XB_MONITOR_TOGGLE)) == NULL)
        return 0;
    asm{
        push ds; push si; push di; push bp;
        call DWORD PTR [feature];
        pop bp; pop di; pop si; pop ds;
        }
    return 1;
}
/**************************************************************/
unsigned contrast_toggle(void)
{
    char far *feature;

if ((feature=find_feature(XB_CONTRAST)) == NULL)
        return 0;
    asm{
        push ds; push si; push di; push bp;
        call DWORD PTR [feature];
        pop bp; pop di; pop si; pop ds;
        }
```

```
    return 1;
}
/****************************************************************/
unsigned speed_toggle(void)
{
    char far *feature;

if ((feature=find_feature(XB_TOGGLE_SPEED)) == NULL)
        return 0;
    asm{
        push ds; push si; push di; push bp;
        call DWORD PTR [feature];
        pop bp; pop di; pop si; pop ds;
        }
    return 1;
}
/****************************************************************/
unsigned set_standby(unsigned status)
{
    char far *feature;

if ((feature=find_feature(XB_STANDBY)) == NULL)
        return 0;
    asm{
        push ss; pop es; lea bx,status;
        push ds; push si; push di; push bp;
        call DWORD PTR [feature];
        pop bp; pop di; pop si; pop ds;
        }
    return 1;
}
/****************************************************************/
unsigned OS2_init(void)
{
    char far *feature;

if ((feature=find_feature(XB_OS2INIT)) == NULL)
        return 0;
    asm{
        push ds; push si; push di; push bp;
        call DWORD PTR [feature];
```

```c
        pop bp; pop di; pop si; pop ds;
        }
    return 1;
}
/**************************************************************/
unsigned set_smartvu(unsigned status)
{
    char far *feature;

if ((feature=find_feature(XB_SMARTVU_ON_OFF)) == NULL)
        return 0;
    asm{
        push ss; pop es; lea bx,status;
        push ds; push si; push di; push bp;
        call DWORD PTR [feature];
        pop bp; pop di; pop si; pop ds;
        }
    return 1;
}
/**************************************************************/
unsigned write_smartvu(char far *string)
{
    char far *feature;

if ((feature=find_feature(XB_SMARTVU)) == NULL)
        return 0;
    asm{
        les bx,string;
        push ds; push si; push di; push bp;
        call DWORD PTR [feature];
        pop bp; pop di; pop si; pop ds;
        }
    return 1;
}
/**************************************************************/
unsigned unlock_3021(void)
{
    char far *feature;

if ((feature=find_feature(XB_UNLOCK_3021)) == NULL)
        return 0;
```

```c
    asm{
        push ds; push si; push di; push bp;
        mov ax,0f000h; mov ds,ax;
        call DWORD PTR [feature];
        pop bp; pop di; pop si; pop ds;
        }
    return 1;
}
/*************************************************/
unsigned get_monitor_type(unsigned *montype)
{
    char far *feature;
    unsigned char fn[4];

if ((feature=find_feature(XB_MONITOR_TYPE)) == NULL)
        return 0;
    fn[3] = 0;
    asm{
        push ss; pop es; lea bx,fn;
        push ds; push si; push di; push bp;
        mov ax,40h; mov ds,ax;
        call DWORD PTR [feature];
        pop bp; pop di; pop si; pop ds;
        cmp ax,0; jne error;
        }
    *montype = fn[2];
    return 1;
error:
    return 0;
}
/*************************************************/
unsigned get_system_video_status(unsigned *status)
{
    char far *feature;
    unsigned char fn[4];

if ((feature=find_feature(XB_MONITOR_TYPE)) == NULL)
        return 0;
    fn[3] = 0;
    asm{
        push ss; pop es; lea bx,fn;
```

```
        push ds; push si; push di; push bp;
        mov ax,40h; mov ds,ax;
        call DWORD PTR [feature];
        pop bp; pop di; pop si; pop ds;
        cmp ax,0; jne error;
        }
    *status = fn[1];
    return 1;
error:
    return 0;
}
/**************************************************************/
unsigned set_monitor_type(unsigned montype)
{
    char far *feature;
    unsigned char fn[4];
    if ((feature=find_feature(XB_MONITOR_TYPE)) == NULL)
        return 0;
    fn[3] = 1;
    fn[0] = montype;
    asm{
        push ss; pop es; lea bx,fn;
        push ds; push si; push di; push bp;
        mov ax,40h; mov ds,ax;
        call DWORD PTR [feature];
        pop bp; pop di; pop si; pop ds;
        cmp ax,0; jne error;
        }
    return 1;
error:
    return 0;
}
```

What is claimed is:

1. A method for operating a computer system, comprising the steps of:

(a) automatically running startup software, from nonvolatile memory, on a central processing unit (CPU) whenever said computer system first initiates operation, said startup software including self-test and bootstrap software;

(b) launching said CPU, from execution of said startup software, into execution of operating system software; and (c) launching said CPU, from execution of said operating system software, into execution of application software;

(d) wherein said CPU, under control of said application software, programmably calls on basic system software to interface to an I/O device according to a format which is substantially independent of a hardware type of said computer system;

(e) wherein said CPU, under the control of said application software, also programmably calls on device driver software to interface to said I/O device according to a format which is substantially independent of said hardware type of said computer system;

(f) wherein said CPU, under control of said operating system software, programmably calls on machine-specific system feature extension software to provide a low-level interface to electrical operations, said system feature extension software being partly. stored in said nonvolatile memory, and containing a self-describing feature table and a plurality of machine-dependent routines which can be executed by said CPU.

* * * * *